United States Patent
Lei et al.

(10) Patent No.: US 11,764,936 B2
(45) Date of Patent: Sep. 19, 2023

(54) INTELLIGENT SWITCHING BETWEEN DUPLEXING MODES IN WIRELESS COMMUNICATION

(71) Applicant: QUALCOMM Incorporated, San Diego, CA (US)

(72) Inventors: Jing Lei, San Diego, CA (US); Huilin Xu, Temecula, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/366,821

(22) Filed: Jul. 2, 2021

(65) Prior Publication Data

US 2022/0006603 A1    Jan. 6, 2022

Related U.S. Application Data

(60) Provisional application No. 63/048,560, filed on Jul. 6, 2020.

(51) Int. Cl.
| | |
|---|---|
| *H04W 72/00* | (2023.01) |
| *H04L 5/14* | (2006.01) |
| *H04L 1/00* | (2006.01) |
| *H04W 76/28* | (2018.01) |
| *H04W 80/02* | (2009.01) |
| *H04W 72/20* | (2023.01) |

(52) U.S. Cl.
CPC .......... *H04L 5/1423* (2013.01); *H04L 1/0025* (2013.01); *H04W 72/20* (2023.01); *H04W 76/28* (2018.02); *H04W 80/02* (2013.01)

(58) Field of Classification Search
None
See application file for complete search history.

(56) References Cited

U.S. PATENT DOCUMENTS

| | | |
|---|---|---|
| 2009/0296609 A1 | 12/2009 | Choi et al. |
| 2011/0222445 A1 | 9/2011 | Alanara |
| 2019/0261409 A1* | 8/2019 | Chen ................. H04L 5/14 |
| 2019/0313269 A1* | 10/2019 | Keskitalo ............ H04B 7/00 |
| 2021/0219329 A1* | 7/2021 | Zhou ................. H04L 5/0094 |
| 2022/0159580 A1* | 5/2022 | Su ................... H04W 72/0446 |
| 2022/0210802 A1* | 6/2022 | Hwang ............. H04L 5/0053 |
| 2022/0216976 A1* | 7/2022 | Zhang ............... H04B 17/327 |

FOREIGN PATENT DOCUMENTS

WO    WO-2012046172 A1    4/2012

OTHER PUBLICATIONS

International Search Report and Written Opinion—PCT/US2021/040523—ISA/EPO—dated Oct. 28, 2021.

(Continued)

*Primary Examiner* — Brandon M Renner
(74) *Attorney, Agent, or Firm* — Loza & Loza LLP

(57) ABSTRACT

A wireless device can flexibly switch between different frequency-division duplexing (FDD) modes including one or more half-duplex (HD) FDD modes and a full-duplex (FD) FDD mode in wireless communication. The wireless device can intelligently switch between the FDD modes to meeting different requirements of power consumption, traffic latency, and/or coverage enhancement.

26 Claims, 20 Drawing Sheets gNB Initiated FDD Mode Switching

(56) References Cited

OTHER PUBLICATIONS

Nokia, et al., "Dynamic Resource Allocation between Backhaul and Access Links", 3GPP TSG RAN WG1 Meeting #93, 3GPP Draft, R1-1806662_IAB_Resource Allocation, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018, (May 12, 2018), 6 Pages, May 20, 2018 (May 20, 2018), XP051462699, Retrieved from the Internet: URL: http://www.3gpp.org/ftp/tsg%5Fran/WG1%5FRL1/TSGR1%5F93/Docs [retrieved on May 12, 2018], p. 2, "option 2", section 3—section 4, figure 5, [retrieved on May 20, 2018], sections 1-4.

\* cited by examiner

INTELLIGENT SWITCHING BETWEEN DUPLEXING MODES IN WIRELESS COMMUNICATION

PRIORITY CLAIM

This application claims priority to and the benefit of provisional patent application No. 63/048,560 filed in the United States Patent Office on Jul. 6, 2020, the entire content of which is incorporated herein by reference as if fully set forth below in its entirety and for all applicable purposes.

TECHNICAL FIELD

The technology discussed below relates generally to wireless communication systems, and more particularly, to wireless devices capable of flexibly switching between different frequency-division duplex (FDD) modes in wireless communication.

INTRODUCTION

In a fifth-generation (5G) New Radio (NR) access network, communication between the network and user equipment (UE) may utilize frequency-division duplex (FDD) or time-division duplex (TDD). In TDD, transmissions in different traffic directions on a given channel are separated from one another using time-division multiplexing. That is, at some times the channel is dedicated for transmissions in one direction (e.g., from device A to device B), while at other times the channel is dedicated for transmissions in the other direction (e.g., from device B to device A). In FDD, the transmitter and receiver at each endpoint can operate at different carrier frequencies or bands (i.e., frequency division multiplexing) for wireless communication.

FDD can be used for full-duplex communication or half-duplex communication, whereas TDD can be used for half-duplex communication. Full-duplex (FD) means both endpoints (e.g., transmitter and receiver) can communicate with one another in both transmit and receive directions simultaneously. Half-duplex (HD) means only one endpoint can send information to the other at a time. An NR network may support devices with various capabilities, cost, and performance requirements, for example, peak throughput, latency, reliability, power efficiency, etc.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide wireless devices and methods that can flexibly and dynamically switch between different frequency-division duplex (FDD) modes including a half-duplex (HD) FDD mode and a full-duplex (FD) FDD mode in wireless communication. A wireless device can intelligently switch between a HD FDD mode and a FD FDD mode to meet different power consumption and performance need in various scenarios. In one example, the wireless device can use the HD FDD mode to achieve power saving in a radio resource control (RRC) connected state. In another example, the wireless device can intelligently switch to the FD FDD mode for mission critical traffic, performance, and/or coverage enhancement.

One aspect of the disclosure provides a user equipment (UE) for wireless communication. The UE includes a transceiver configured to use a plurality of frequency-division duplexing (FDD) modes for wireless communication. The plurality of FDD modes includes at least one full-duplex (FD) FDD mode and at least one half-duplex (HD) FDD mode. The UE further includes a memory and a processor connected with the transceiver and the memory. The processor and the memory are configured to communicate, using the transceiver, with a scheduling entity in a first FDD mode among the plurality of FDD modes. The processor and the memory are further configured to switch from the first FDD mode to a second FDD mode of the plurality of FDD modes, in response to a first triggering condition corresponding to at least one of a power consumption or a performance level of the UE. The processor and the memory are further configured to communicate with the scheduling entity in the second FDD mode.

Another aspect of the disclosure provides a method of wireless communication at a user equipment (UE). The UE communicates with a scheduling entity in a first frequency-division duplexing (FDD) mode among a plurality of FDD modes. The plurality of FDD modes includes at least one full-duplex (FD) FDD mode and at least one half-duplex (HD) FDD mode. The UE switches from the first FDD mode to a second FDD mode of the plurality of FDD modes, in response to a first triggering condition corresponding to at least one of a power consumption of the UE or a performance level of the UE. The UE communicates with the scheduling entity in the second FDD mode.

Another aspect of the disclosure provides a scheduling entity for wireless communication. The scheduling entity includes a transceiver configured to use a plurality of frequency-division duplexing (FDD) modes for wireless communication. The plurality of FDD modes includes at least one full-duplex (FD) FDD mode and at least one half-duplex (HD) FDD mode. The scheduling entity further includes a memory and a processor operatively coupled with the transceiver and the memory. The processor and the memory are configured to communicate, using the transceiver, with a user equipment (UE) in a first FDD mode among the plurality of FDD modes. The processor and the memory are further configured to switch from the first FDD mode to a second FDD mode of the plurality of FDD modes, in response to a first triggering condition corresponding to at least one of a power consumption or a performance level of the UE. The processor and the memory are further configured to communicate with the UE in the second FDD mode.

Another aspect of the disclosure provides a method of wireless communication at a scheduling entity. The scheduling entity communicates with a user equipment (UE) in a first frequency-division duplexing (FDD) mode among a plurality of FDD modes. The plurality of FDD modes includes at least one full-duplex (FD) FDD mode and at least one half-duplex (HD) FDD mode. The scheduling entity further switches from the first FDD mode to a second FDD mode of the plurality of FDD modes, in response to a first triggering condition corresponding to at least one of a power consumption or a performance level of the UE. The scheduling entity further communicates with the UE in the second FDD mode.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
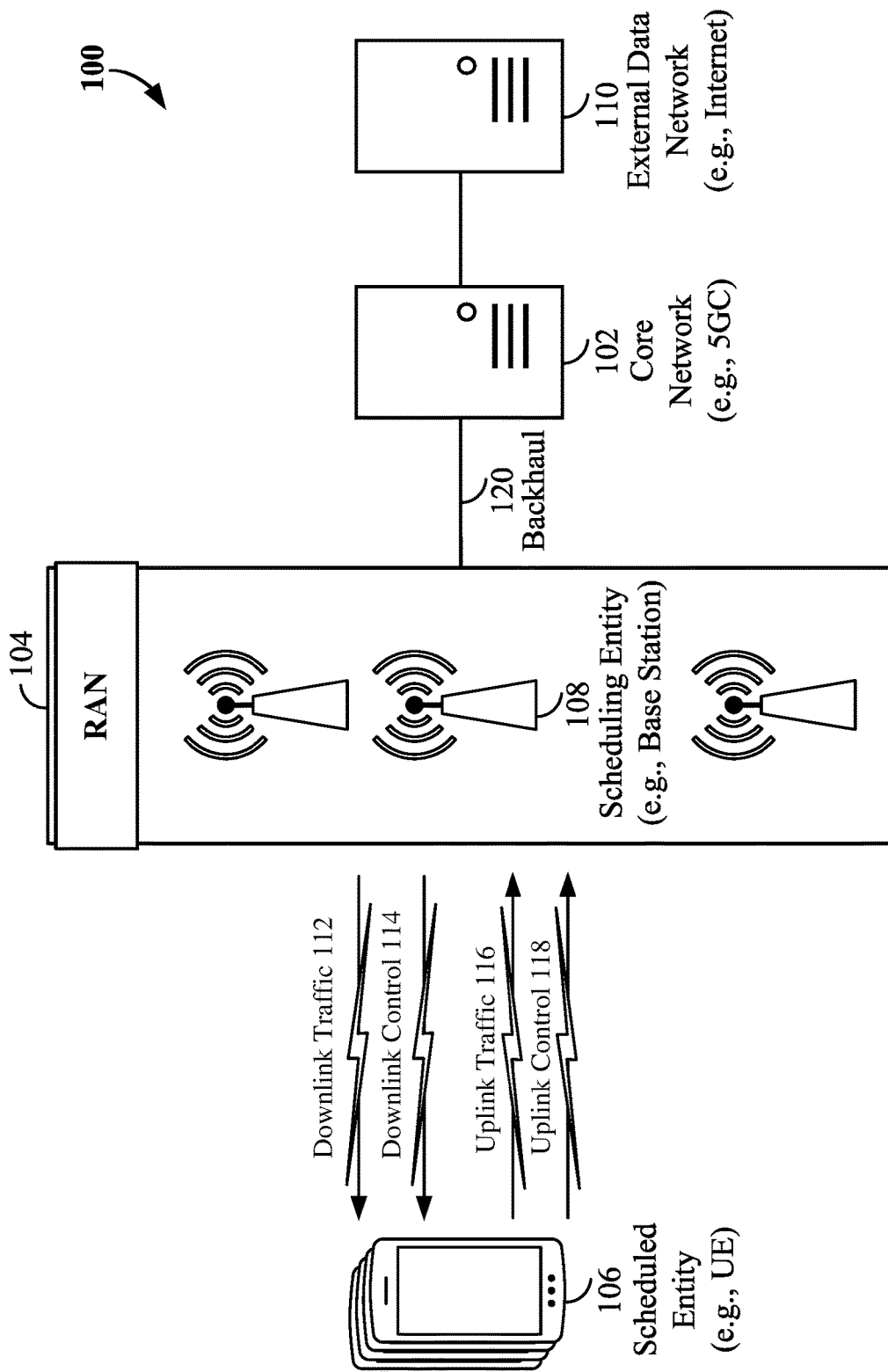
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide methods and apparatus for flexibly switching between different frequency-division duplex (FDD) modes in wireless communication. Examples of FDD modes include half-duplex (HD)

FDD and full-duplex (FD) FDD. A FDD mode can use different carrier frequencies or bands for wireless communication in different directions. For example, a first wireless device can use a first carrier frequency or band to transmit communication signals to a second wireless device and use a second carrier frequency or band to receive communication signals from the second wireless device. In some aspects, a wireless device can flexibly switch between a FD FDD mode and a HD FDD mode in consideration of power consumption, desired performance, and other consideration.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
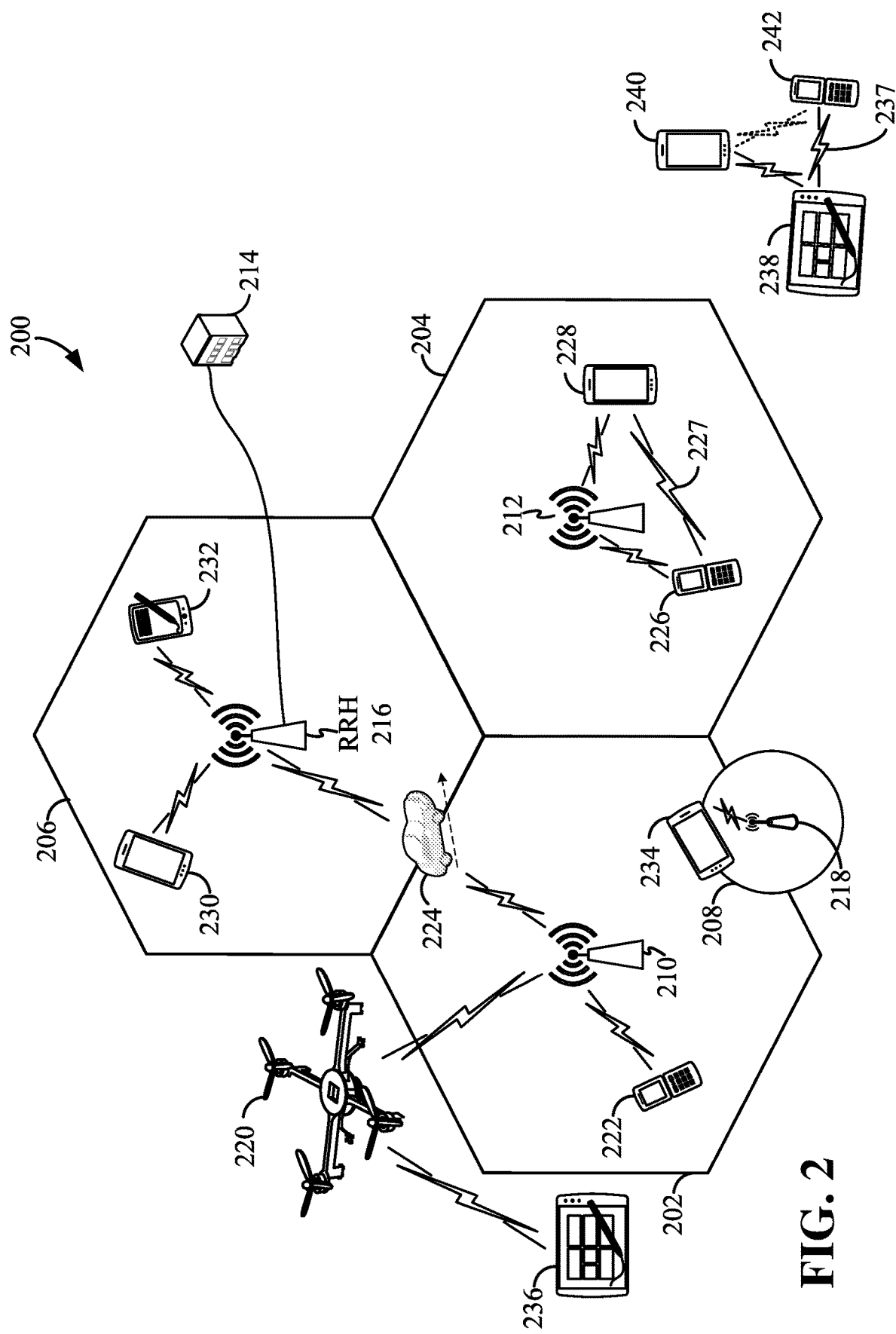
FIG. 2 is a schematic illustration of an exemplary radio access network according to some aspects of the disclosure.

Referring now to FIG. 2, by way of example and without limitation, a schematic illustration of a radio access network (RAN) 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel (e.g., within the same carrier bandwidth) are separated from one another using time division multiplexing. That is, at some times (e.g., a first slot/symbol) the channel is dedicated for transmissions in one direction, while at other times (e.g., a second slot/symbol) the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In SDD, transmissions in different directions on a given channel are separated from one another using spatial division multiplexing (SDM). In one example of FDD, transmissions in different directions may operate at different carrier frequencies (e.g., within paired spectrum). In another example of FDD, full-duplex communication may be implemented within unpaired spectrum (e.g., within a single carrier bandwidth), where transmissions in different directions occur within different sub-bands of the carrier bandwidth. This type of full-duplex communication may also be referred to herein as sub-band full-duplex (SBFD) or flexible duplex.

FDD may also be utilized in HD modes of operation, where transmissions in different directions are separated in both time and frequency.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
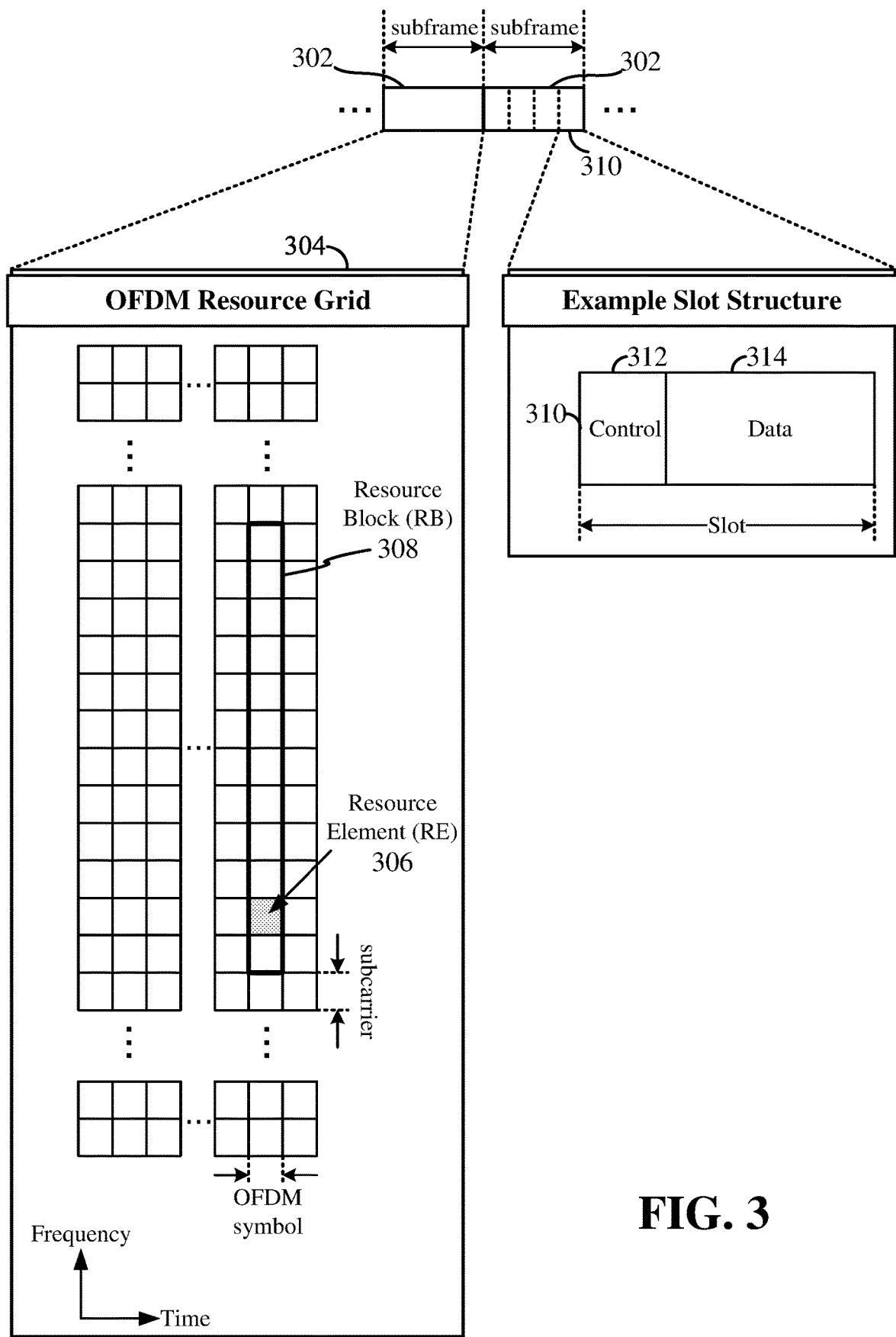
FIG. 3 is a schematic illustration of an organization of wireless resources in an air interface utilizing orthogonal frequency divisional multiplexing (OFDM) according to some aspects of the disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1-3 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
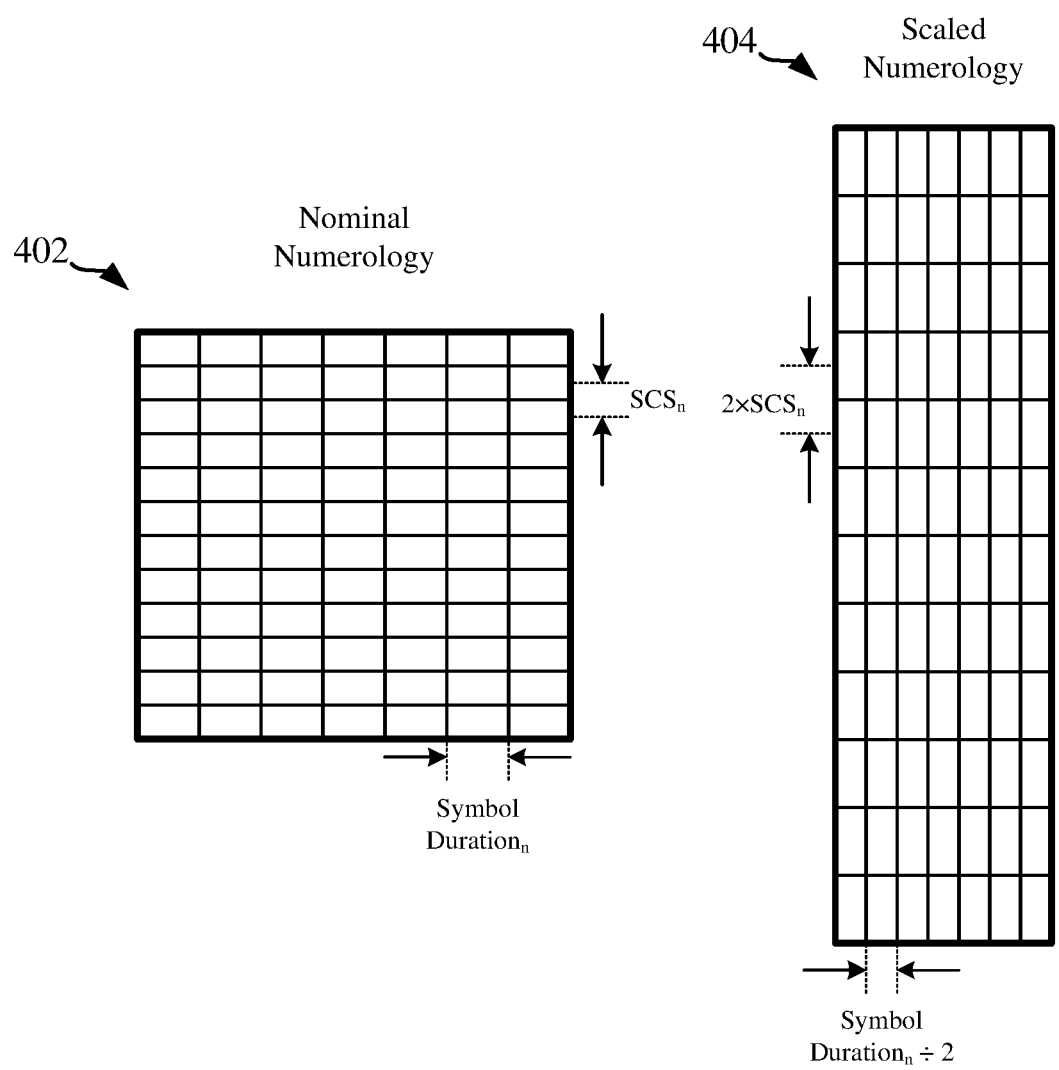
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology relative to the nominal numerology. As one example, the first RB 402 may have a nominal subcarrier spacing ($SCS_n$) of 30 kHz, and a nominal symbol duration, of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

Figure 5:
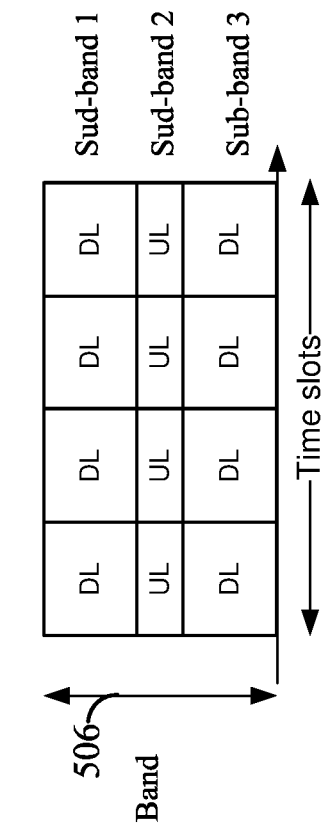
FIG. 5 is a schematic illustration of exemplary time-division duplex (TDD) and sub-band full-duplex operations according to some aspects of the disclosure.
Figure 5:
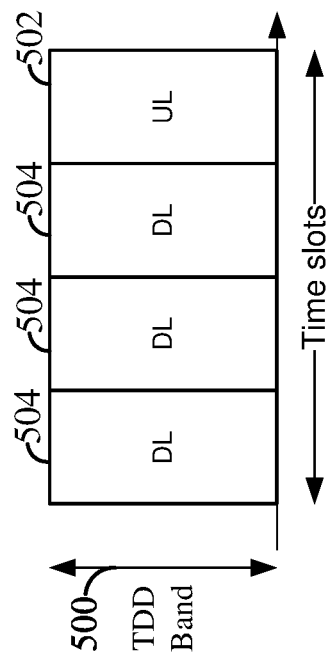

FIG. 5 is a diagram illustrating exemplary half-duplex TDD and sub-band full-duplex operations according to some aspects of the disclosure. TDD allows two endpoints to communicate with each other in different traffic directions on a given channel using time-division multiplexing. For example, a scheduling entity 108 (e.g., a base station or gNB) can communicate with a scheduled entity 106 (e.g., UE) using a fixed or predetermined uplink-to-downlink duration ratio in a TDD frequency band, channel, or bandwidth part (BWP). In one exemplary TDD frequency band 500, one uplink (UL) slot 502 is time-multiplexed with three downlink (DL) slots 504. In some cases, the uplink latency may be too long for certain latency-sensitive services or applications.

To improve the latency, the scheduled entity may communicate with the scheduling entity using a sub-band FD mode in which DL and UL transmissions can occur simultaneously using different frequencies, bands, sub-bands, or BWPs. In one example, a frequency band 506 (e.g., 100 MHz band) may be divided into multiple sub-bands (e.g., sub-band 1, sub-band 2, and sub-band 3), and each sub-band may be assigned for UL or DL to support FD communication using different sub-bands to enable simultaneous UL and DL transmissions. In some aspects, the frequency band 506 may be a TDD band. In some aspects, the sub-bands may have equal bandwidth. In some aspects, the sub-bands may have different bandwidths. This use of sub-bands for FD communication may be referred to herein as sub-band FDD, which is different from FD communication using separate FDD bands (paired spectrum). For example, paired FDD bands may be used for UL and DL transmissions, respectively, to support FD communication.

Figure 6:
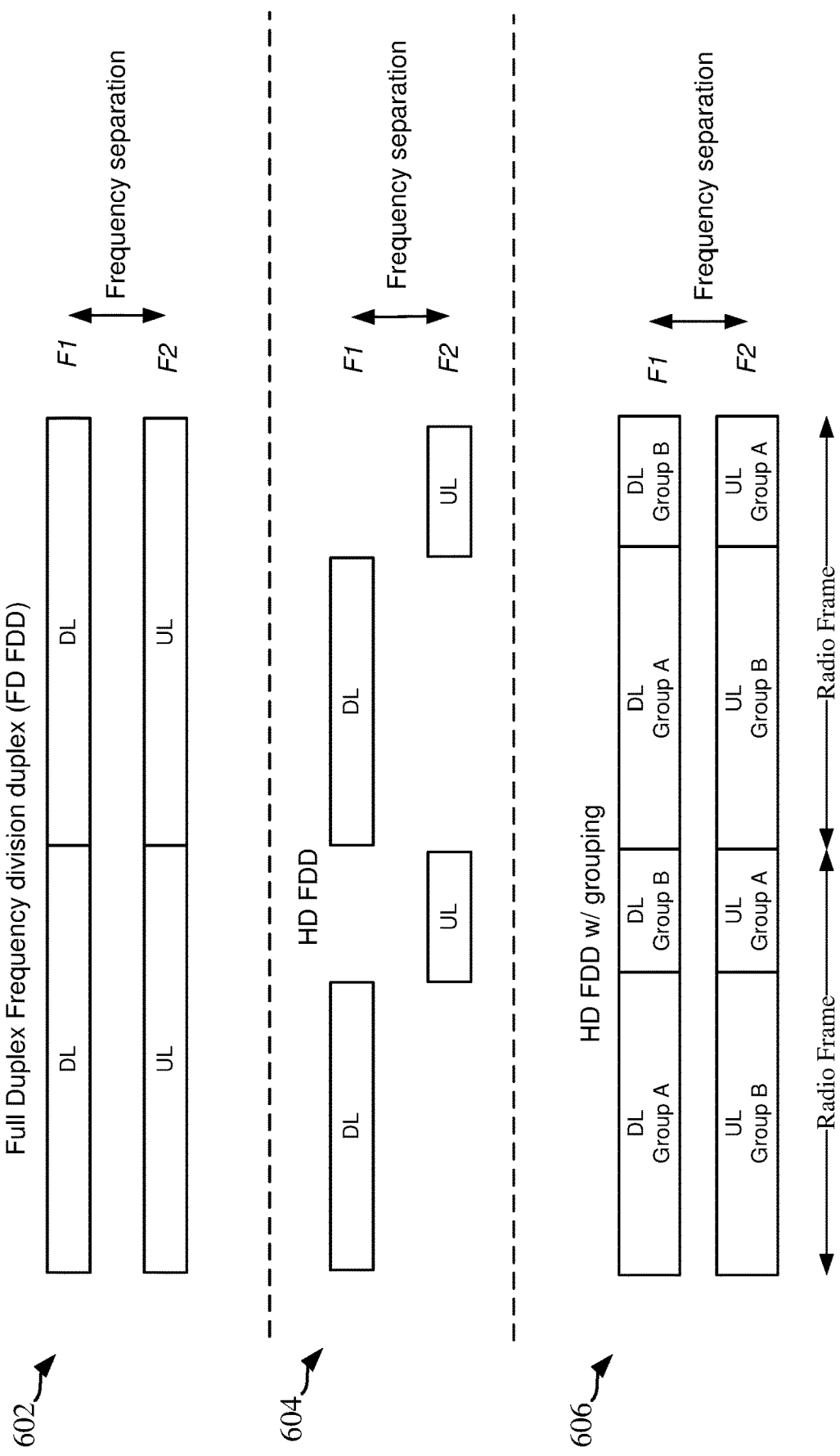
FIG. 6 is a schematic illustration of exemplary FDD communications according to some aspects of the disclosure.

In some aspects, a UE can flexibly select different FDD modes due to different power and/or performance requirements. FIG. 6 is a diagram illustrating some examples of different FDD modes. In a first FDD example 602 (FD FDD), a DL transmission can use a first band F1, and a UL transmission can use a second band F2. In a second FDD example 604 (HD FDD), UL and DL transmissions are time-multiplexed and use different frequency bands for UL and DL transmissions, respectively. For example, a DL transmission can use F1, and a UL transmission can use F2. In one aspect, the frequency bands F1 and F2 may be paired FDD spectrum. In one aspect, the frequency bands F1 and F2 may be TDD sub-bands. In some aspects, HD FDD may be implemented with complementary user groupings 606 to improve bandwidth utilization. In one aspect, DL transmissions of group A UEs and group B UEs are time-multiplexed on F1, and UL transmissions of group A UEs and group B UEs are time-multiplexed on F2. Using complementary user groupings, a group A UE can transmit signals and a group B UE can receive signals in the same radio frame; or a group A UE can receive signals and a group B UE can transmit in the same radio frame. In some aspects, the FD FDD and HD FDD modes can be implemented using TDD sub-bands or paired FDD spectrum/bands. In some aspects, FD FDD may be implemented using other FDD schemes, for example, inter-band FDD and other sub-band FDD modes different from that illustrated in FIGS. 5 and 6.

For example, the UE can use the FD FDD mode to reduce latency and use the HD FDD mode to reduce power consumption, for example, in a radio resource control (RRC) connected state. In HD FDD, the UE only transmits or receives signals to/from the network in a time slot. In one aspect, the UE can use the HD FDD mode on paired spectrum. In one example, the paired spectrum may include different FDD bands. In one aspect, the UE can use the HD FDD mode on sub-bands of a TDD band. In the HD FDD mode, the UE can save power by not monitoring/decoding downlink channels and not measuring downlink signals when performing UL transmission. In one example, the downlink channels may include PDCCH and PDSCH. In one example, the downlink signals may include an SS block and CSI-RS. In some aspects, the UE can use the FD FDD mode to provide more bandwidth and/or lower latency for mission critical traffic (e.g., VOIP, V2V) and/or coverage enhancement. Therefore, a UE capable of switching between FD FDD and HD FDD modes can intelligently improve power saving and provide on-demand service to latency-sensitive service and/or coverage enhancement when needed, as compared to HD FDD mode only UEs.

In this disclosure, a UE that can support and flexibly switch among multiple FDD modes (e.g., FD FDD and HD FDD modes) is called a FD FDD capable UE. In some aspects, a FD FDD capable UE can use paired spectrum or sub-bands (e.g., TDD sub-bands) for simultaneous UL and DL communication. The UE can indicate its ability of using different FDD modes (e.g., HD FDD and FD FDD) and flexible switching between the FDD modes as a UE capability.

Figure 7:
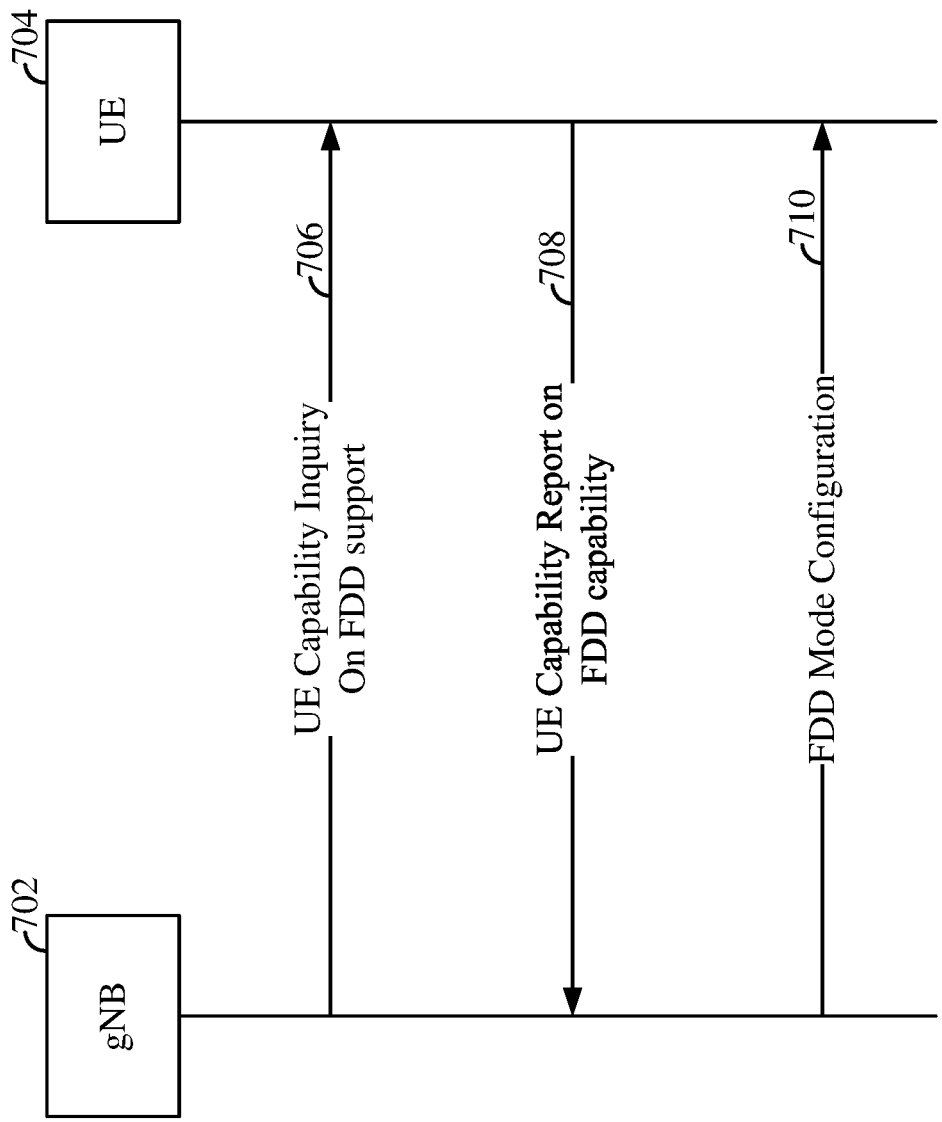
FIG. 7 is a schematic illustration of exemplary signaling between a scheduling entity and a UE for signaling support of dynamic FDD modes switching according to some aspects of the disclosure.

FIG. 7 is a diagram illustrating exemplary signaling between a scheduling entity 702 and a UE 704 for signaling support of FDD modes switching according to some aspects of the disclosure. The scheduling entity 702 may be any of the scheduling entities, gNBs, or base stations described herein, for example in relation to FIGS. 1 and 2. The UE 704 may be any of the UEs or scheduled entities described herein, for example in relation to FIGS. 1 and 2. The scheduling entity 702 (e.g., gNB) can transmit a UE capability inquiry 706 to the UE 704 that may have established an RRC connection (e.g., RRC connected mode) with the scheduling entity. The UE capability inquiry 706 (e.g., UECapabilityEnquiry message) can specify which information the scheduling entity wants to obtain from the UE. In response, the UE 704 can report the requested capability information. After knowing the UE capability, the scheduling entity 702 can make the appropriate scheduling for the UE in various scenarios. In one example, the UE capability inquiry 706 may be included in an RRC message that requests the UE to report its capability of supporting various FDD modes, for example, one or more FD FDD modes and a HD FDD mode.

In response to the UE capability inquiry 706, the UE 704 may transmit a UE capability report 708 to the scheduling entity 702. For example, the UE can transmit an RRC message including the UE capability report 708 (e.g., a UECapabilityInformation message). In some aspects, the UE capability report 708 may indicate supported frequency bands and FDD modes (e.g., one or more FD FDD modes and a HD FDD mode) supported by the UE. The UE capability report 708 can also indicate the UE's capability of switching between the supported FDD modes, for example, between different FD FDD modes or between a FD FDD mode and a HD FDD mode.

In one aspect, the UE capability report 708 can indicate that the UE 704 can support various FDD modes that have different ratios of UL and DL duration per slot/symbol. In one aspect, the UE capability report 708 can indicate that the UE 704 can support various FDD modes that are different in DL bandwidth (e.g., BWP) and/or UL bandwidth (e.g., BWP). In one aspect, the UE capability report 708 can indicate that the UE 704 can support various FDD modes that are different in flexible slot/symbol support. In one aspect, the UE capability report 708 can indicate that the UE can support various FDD modes that are different in discontinuous reception (DRX) and/or discontinuous transmission (DTX) configurations. In one aspect, the UE capability report 708 can indicate that the UE can support various FDD modes that are different in DL and/or UL reference signal resources. Examples of DL reference signals include, but are not limited to, CSI-RS, DM-RS, tracking reference signal (TRS) and PT-RS. Examples of UL reference signals include, but are not limited to, SRS, DM-RS and PT-RS. In one aspect, the UE capability report 708 can indicate that the UE can support various FDD modes that have different configurations of CSI, radio link monitoring (RLM), and/or radio resource management (RRM).

Based on the UE capability report 708, the scheduling entity 702 may transmit FDD mode configuration information 710 to the UE. In one aspect, the FDD mode configuration information 710 can include the slot formats, BWP, scheduling offsets, application delay, etc., for one or more FDD modes. In one example, the scheduling entity 702 can transmit the FDD mode configuration information 710 in an RRC message. In some aspects, the FDD mode configuration information 710 can indicate the FDD mode (e.g., FD FDD and HD FDD) selected for communication between the scheduling entity and UE and related configuration information. In some aspects, the scheduling entity 702 can transmit timing or a timer configuration for switching between the FDD modes in at least one of system information (e.g., MIB, SIB) or an RRC message.

Figure 8:
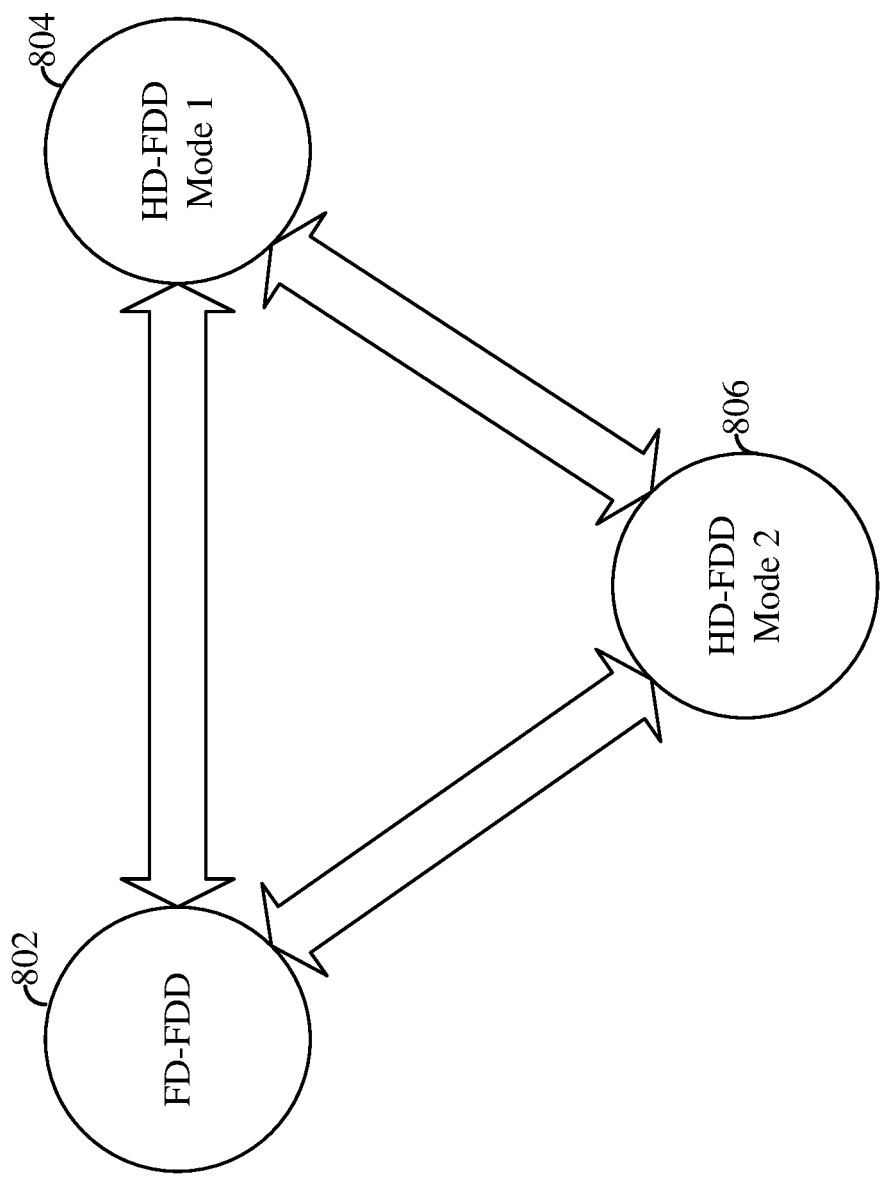
FIG. 8 is a schematic illustration of exemplary dynamic FDD modes switching according to some aspects of the disclosure.

FIG. 8 is a diagram illustrating exemplary FDD modes switching according to some aspects of the disclosure. In some aspects, a scheduled entity 106 (e.g., UE) is capable of communicating with a network (e.g., one or more scheduling entities 108 or gNBs) using different FDD modes (e.g., a FD FDD mode 802 and one or more HD FDD modes 804 and 806). In some aspects, the UE may support two or more HD FDD modes that have different configurations. In some aspects, different HD FDD modes may be different in terms of UL/DL slot/symbol ratio, numerology, UL/DL bandwidth (e.g., BWP), slot/symbol duration, DRX/DTX parameters, UL/DL reference signal resources, and/or measurement and reporting configuration. For example, a UE may use different measurement and reporting configurations for CSI, RLM, and/or RRM, in different HD FDD modes (e.g., HD FDD mode 1 and HD FDD mode 2).

In one aspect, a UE may switch from the FD FDD mode 802 to a first HD FDD mode 804 (e.g., the HD FDD mode 1). In one aspect, the UE may switch from the first HD FDD mode 804 to the FD FDD mode 802 or a second HD FDD mode 806 (e.g., HD FDD mode 2). In one aspect, the UE may switch from second HD FDD mode 806 to the first HD FDD mode 804 or the FD FDD mode 802. The switching between the FDD modes can be initiated by the scheduling entity or requested by the UE. The switching between the FDD modes can be dynamic or semi-persistent. For example, dynamic switching between FDD modes allows the UE to change the FDD mode in use in each subframe. In some aspects, the scheduling entity can initiate dynamic switching between FDD modes using a media access control (MAC) control element (CE) (PDSCH) and/or DCI (PDCCH). In some aspects, the UE can request dynamic switching between FDD modes using a MAC CE (PUSCH) and/or UCI (PUCCH or PUSCH). In one aspect, the scheduling entity may configure the UE to switch between the FDD modes when certain conditions (e.g., latency or bandwidth requirements) are met. In one example, the scheduling entity can set a timer (e.g., timer 1407) that can trigger the UE to switch between the FD FDD mode and one or more HD FDD modes according to a predetermined pattern or periodicity. Using different FDD modes, the UE can achieve power saving and provide on-demand service to latency-sensitive service and/or coverage enhancement when needed. In one example, the UE can have a lower power consumption and/or higher latency in the first HD FDD mode 804, but the UE can have higher power consumption and/or lower latency in the second HD FDD mode 806 or FD FDD mode 802.

Figure 9:
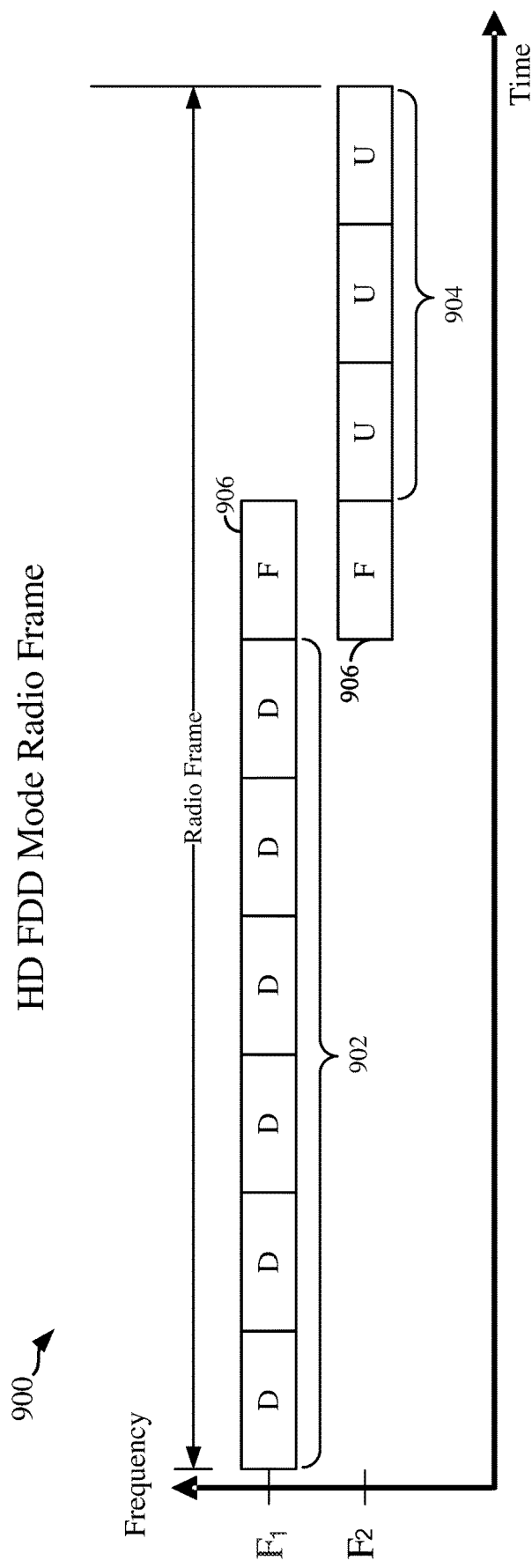
FIG. 9 is a schematic illustration of a first exemplary HD FDD mode radio frame according to some aspects of the disclosure.

FIG. 9 is a diagram illustrating a first exemplary HD FDD mode radio frame 900 according to some aspects of the disclosure. The radio frame 900 can have various combinations of UL, DL, and flexible slots in different HD FDD modes (e.g., HD FDD mode 1 and HD FDD mode 2 in FIG. 8). In one example, the radio frame 900 may include six DL slots 902 using a first band (F1), three UL slots 904 using a second band (F2), and one flexible (F) slot 906 using F1 or F2. The flexible slot can include one or more flexible symbols that can be configured as DL, UL, DRX, or DTX symbols.

Figure 10:
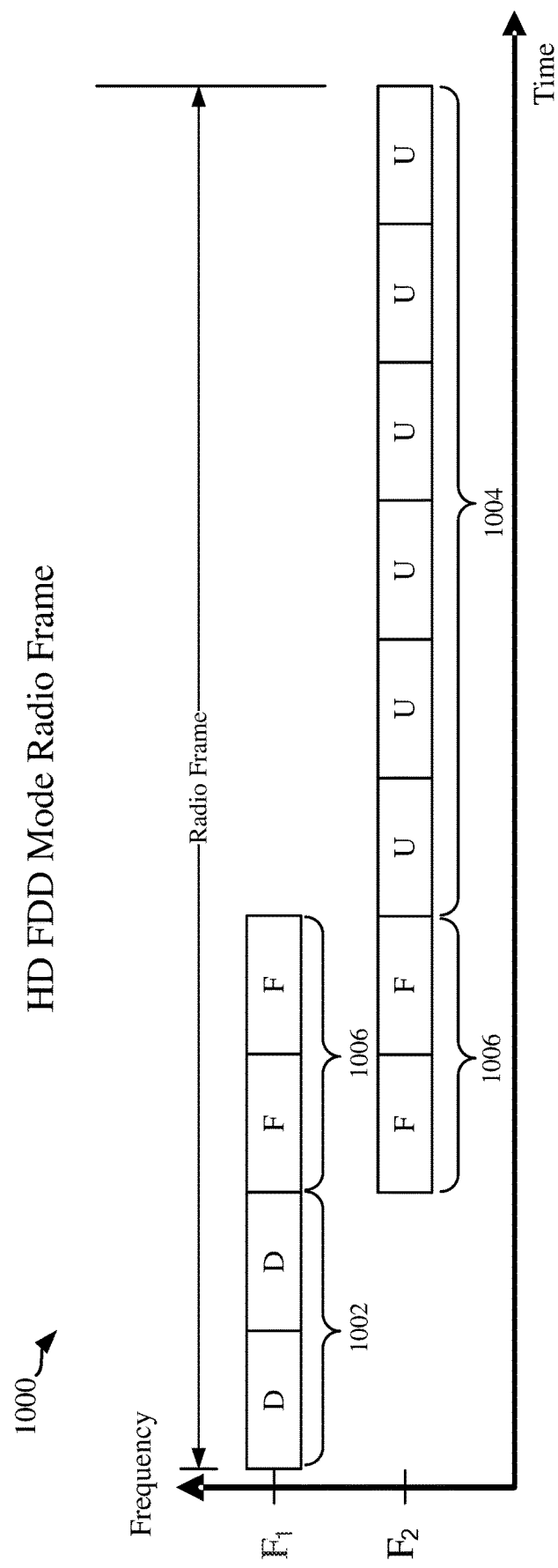
FIG. 10 is a schematic illustration of a second exemplary HD FDD mode radio frame according to some aspects of the disclosure.

FIG. 10 is a diagram illustrating a second exemplary HD FDD mode radio frame 1000. In this example, the radio frame 1000 may include two DL slots 1002 using a first band (F1), six UL slots 1004 using a second band (F2), and two flexible slots 1006 using F1 or F2. Each flexible (F) slot 1006 includes one or more symbols that can be configured as DL, UL, DRX, or DTX symbols. In some aspects, a HD FDD radio frame may have more or less UL, DL, and/or flexible slots than those shown in FIGS. 9 and 10.

Figure 11:
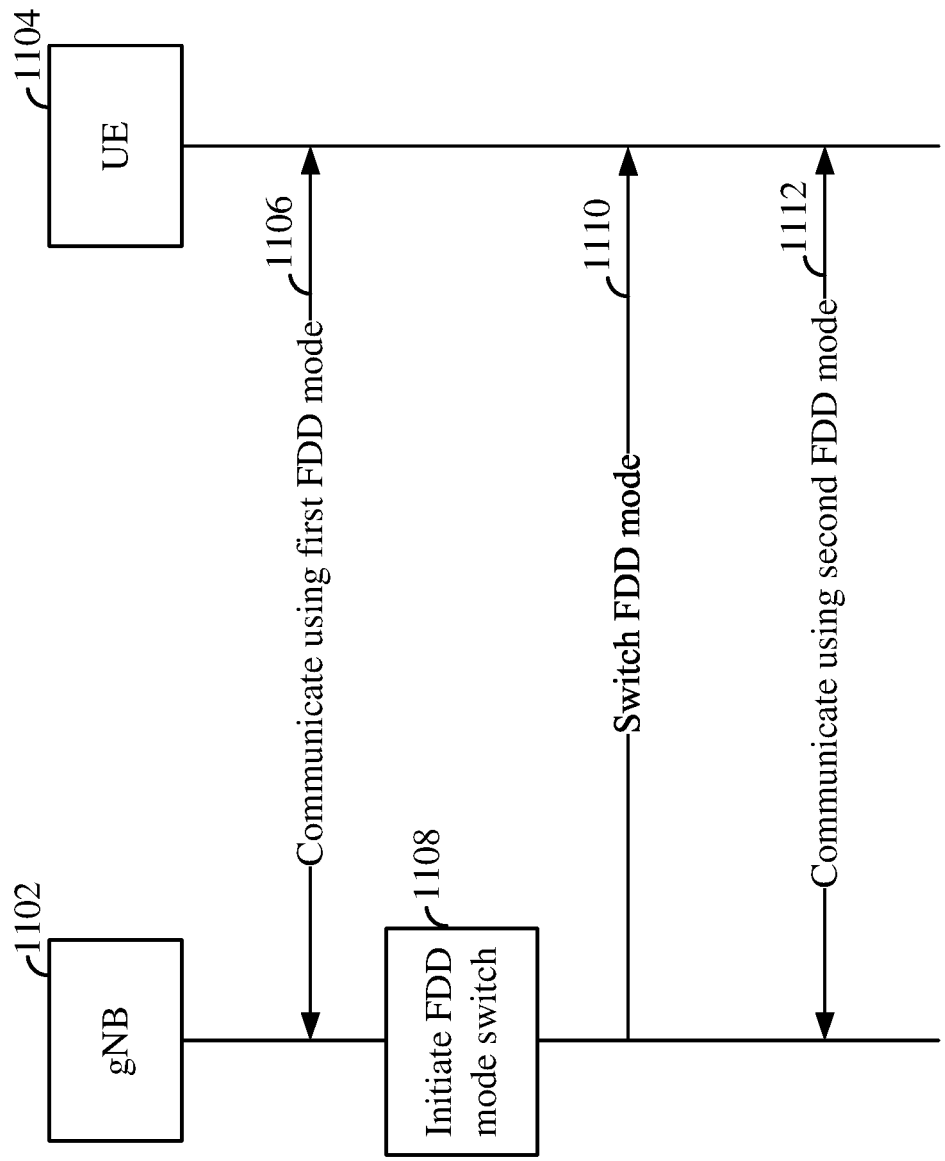
FIG. 11 is a diagram illustration of a FDD mode dynamic switching timeline according to some aspects of the disclosure.

FIG. 11 is a diagram illustrating an example of gNB-initiated FDD mode switching according to some aspects of the disclosure. A gNB 1102 can communicate with a UE 1104 using a first FDD mode 1106. The gNB 1102 can be any of the scheduling entities or base stations described above in relation to FIGS. 1 and 2. The UE 1104 can be any of the scheduled entities or UEs described above in relation to FIGS. 1 and 2. In some aspects, the first FDD mode 1106 may be a FD FDD mode or a HD FDD mode as described above in relation to FIG. 8. The gNB 1102 can dynamically initiate FDD mode switching 1108, for example, to change the power consumption and/or performance of the UE. To that end, the gNB 1102 can transmit a FDD mode switching command 1110 to the UE 1104. In one example, the gNB 1102 can transmit the FDD mode switching command 1110 in a MAC CE on a PDSCH to facilitate dynamic switching of FDD modes. In another example, the gNB 1102 can transmit the FDD mode switching command 1110 in a DCI on a PDCCH to facilitate dynamic switching of FDD modes.

After receiving the FDD mode switching command 1110, the UE 1104 can switch to a second FDD mode 1112 to communicate with the gNB 1102. The second FDD mode can be different from the first FDD mode in at least one of: an uplink-to-downlink time duration ratio; an uplink bandwidth and downlink bandwidth configuration; a time duration of a flexible slot of the HD FDD mode; a time duration for a flexible symbol of the HD FDD mode; a DRX configuration; a DTX configuration; a downlink reference signal configuration; an uplink reference signal configuration; a radio link management configuration; or a radio resource management configuration.

Figure 12:
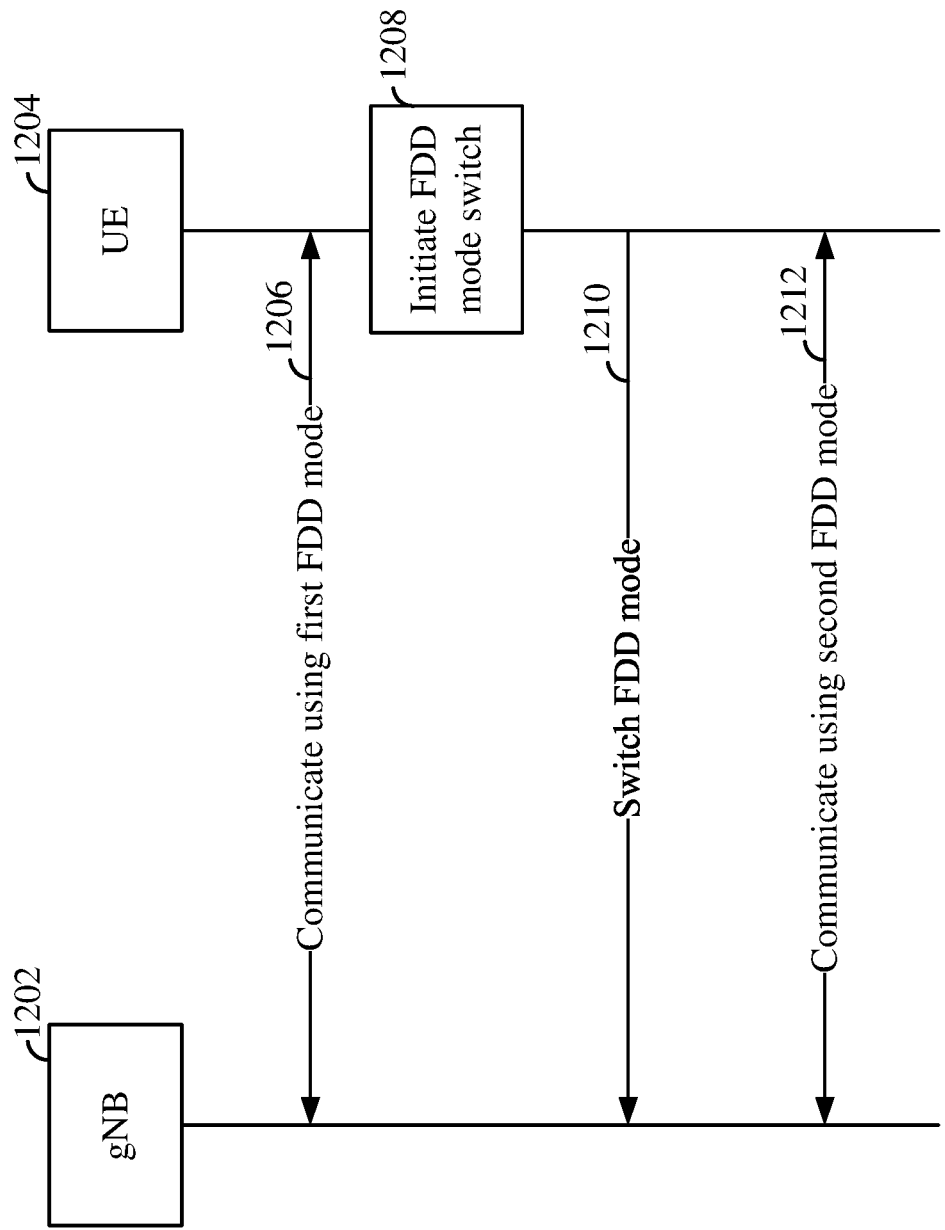
FIG. 12 is a diagram illustrating an example of UE initiated FDD mode dynamic switching according to some aspects of the disclosure.

FIG. 12 is a diagram illustrating an example of UE initiated FDD mode dynamic switching according to some aspects of the disclosure. A gNB 1202 can communicate with a UE 1204 using a first FDD mode 1206. The gNB 1202 can be any of the scheduling entities or base stations described above in relation to FIGS. 1 and 2. The UE 1204 can be any of the scheduled entities or UEs described above in relation to FIGS. 1 and 2. In some aspects, the first FDD mode 1206 may be a FD FDD mode or a HD FDD mode as described above in relation to FIGS. 8-10. The UE 1204 can dynamically initiate FDD mode switching 1208, for example, to change the latency, power consumption, and/or performance of the UE. To that end, the UE 1204 can transmit a FDD mode switching command 1210 to the gNB 1202. In one example, the UE 1204 can transmit the FDD mode switching command 1210 in a MAC CE on a PUSCH. In another example, the UE 1204 can transmit the FDD mode switching command 1210 in a UCI on a PUCCH.

After receiving the FDD mode switching command 1210, the gNB 1202 can switch to a second FDD mode 1212 to communicate with the UE 1204. The second FDD mode can be different from the first FDD mode in at least one of: an uplink-to-downlink time duration ratio; an uplink bandwidth and downlink bandwidth configuration; a time duration of a flexible slot of the HD FDD mode; a time duration for a flexible symbol of the HD FDD mode; a DRX configuration; a DTX configuration; a downlink reference signal configuration; an uplink reference signal configuration; a radio link management configuration; or a radio resource management configuration.

Figure 13:
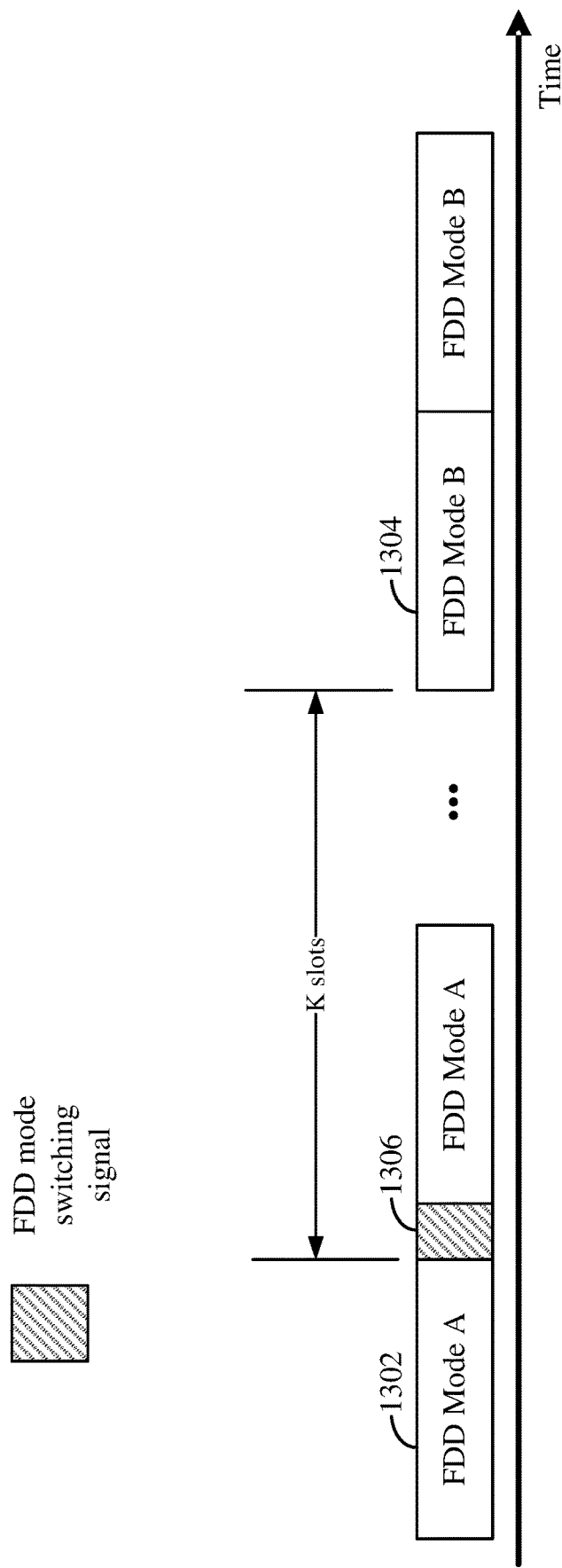
FIG. 13 is a diagram illustrating a FDD mode switching timeline according to some aspects of the disclosure.

FIG. 13 is a diagram illustrating a FDD mode switching timeline according to some aspects of the disclosure. When a scheduling entity (e.g., gNB) and a UE dynamically switch the FDD mode in use, for example, as described above in relation to FIGS. 11 and 12, a scheduling offset (e.g., a timing offset) may be used to account for the time needed to switch from a current FDD mode 1302 (e.g., FD FDD or HD FDD) to a new FDD mode 1304 (e.g., HD FDD or FD FDD). In one example, the scheduling entity can signal the scheduling offset 1306 in a DCI in a PDCCH or a MAC CE in a PDSCH. In one example, the scheduling entity can signal the scheduling offset in a FDD mode switching command 1110. In one example, the UE can signal the scheduling offset in a FDD mode switching command 1210. In some aspects, the scheduling offset may be a predetermined time duration (e.g., k slots) between the FDD mode switching signaling and the start of the slot that uses the new FDD mode. A minimum scheduling offset $k_{min}$ (e.g., in slots) can be used as the lower bound of the scheduling offset (k). In one aspect, $k_{min}$ can be preconfigured, for example, specified in a communication standard that governs the communication between the scheduling entity and UE. In one aspect, the scheduling entity can configure $k_{min}$, for example, indicating $k_{min}$ in system information (SI) and/or an RRC message. In one example, the scheduling entity can signal the slot index of the slot in which the new FDD mode 1304 can start. For example, the scheduling entity can explicitly signal the slot index as a timing indicator k, where $k \geq k_{min}$, and $k_{min}$ can be determined by the minimum SCS of the active DL BWP for the current FDD mode and new FDD mode, respectively.

Figure 14:
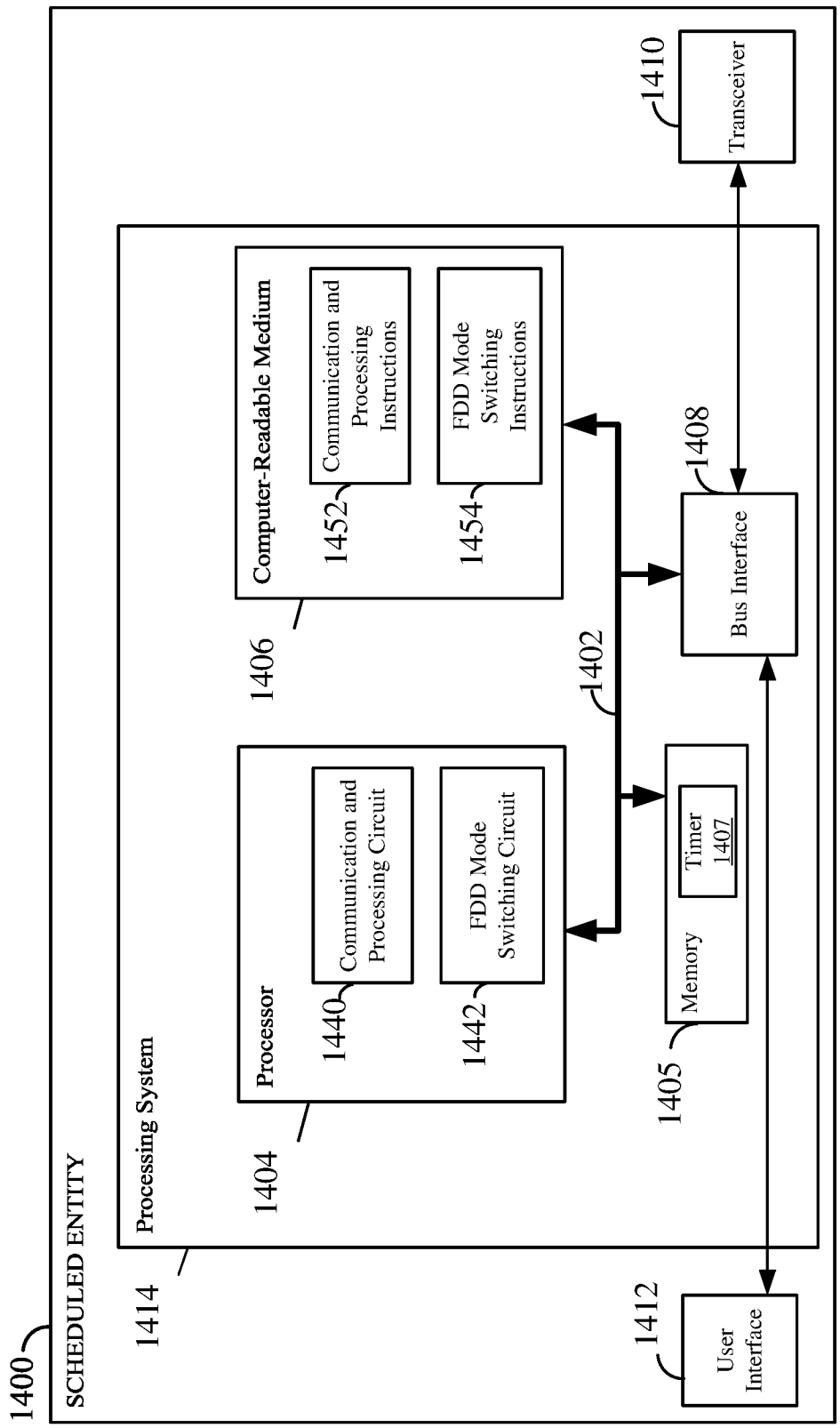
FIG. 14 is a block diagram illustrating an example of a hardware implementation for a scheduled entity according to some aspects of the disclosure.

FIG. 14 is a block diagram illustrating an example of a hardware implementation for a scheduled entity 1400 employing a processing system 1414. For example, the scheduled entity 1400 may be a UE as illustrated in any one or more of FIGS. 1, 2, 7, 11, and/or 12.

The scheduled entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1400 may be configured to perform any one or more of the functions described herein. That is, the processor 1404, as utilized in a scheduled entity 1400, may be used to implement any one or more of the processes and procedures described herein, for example, illustrated in FIGS. 7, 8, 11-13, and 15-17.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions, including, for example, wireless communication using various FDD modes (e.g., one or more FD FDD and HD FDD modes) and FDD mode switching methods. For example, the circuitry may be configured to implement one or more of the functions and processes described in relation to FIGS. 15-17.

In some aspects of the disclosure, the processor 1404 may include communication and processing circuitry 1440 configured for various functions, including for example communicating with scheduling entities (e.g., gNB) or any other entity, such as, for example, local infrastructure via the scheduling entities. In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1440 may include one or more transmit/receive chains. In addition, the communication and processing circuitry 1440 may be configured to process and transmit uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1440 may further be configured to execute communication and processing instructions (software) 1452 stored on the computer-readable medium 1406 to implement one or more functions described herein. For example, the communication and processing circuitry 1440 may be configured to use various FDD modes for wireless communications.

In some implementations where the communication involves receiving information, the communication and processing circuitry 1440 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1440 may output the information to another component of the processor 1404, to the memory 1405, or to the bus interface 1408. In some examples, the communication and processing circuitry 1440 may receive one or more of signals, messages, other information, or any combination thereof. In some examples, the communication and processing circuitry 1440 may receive information via one or more channels. In some examples, the communication and processing circuitry 1440 may include functionality for a means for receiving. In some examples, the communication and processing circuitry 1440 may include functionality for a means for processing, including a means for demodulating, a means for decoding, etc.

In some implementations where the communication involves sending (e.g., transmitting) information, the communication and processing circuitry 1440 may obtain information (e.g., from another component of the processor 1404, the memory 1405, or the bus interface 1408), process (e.g., modulate, encode, etc.) the information, and output the processed information. For example, the communication and processing circuitry 1440 may output the information to the transceiver 1410 (e.g., that transmits the information via radio frequency signaling or some other type of signaling suitable for the applicable communication medium). In some examples, the communication and processing circuitry 1440 may send one or more of signals, messages, other information, or any combination thereof. In some examples, the communication and processing circuitry 1440 may send information via one or more channels. In some examples, the communication and processing circuitry 1440 may include functionality for a means for sending (e.g., a means for transmitting). In some examples, the communication and processing circuitry 1440 may include functionality for a means for generating, including a means for modulating, a means for encoding, etc.

In some aspects, the processor 1404 may include FDD mode switching circuitry 1442 that can be configured to perform various functions and processes used to switch between different FDD modes, for example, a FD FDD mode and one or more HD FDD modes that can be used for wireless communication between the scheduled entity 1400 and a scheduling entity (e.g., gNB or base station). In one example, the FDD mode switching circuitry 1442 may determine a triggering condition to switch between two FDD modes (e.g., an FD FDD mode and one or more HD FDD modes). In some examples, the FDD mode switching circuitry 1442 may include one or more hardware components that provide the physical structure that performs processes related to FDD mode switching in wireless communication. In some aspects, the scheduled entity may maintain a timer 1407 (e.g., in memory 1405) for determining timing for switching between different FDD modes. The FDD mode switching circuitry 1442 may further be configured to execute FDD mode switching instructions (software) 1454 stored on the computer-readable medium 1406 to implement one or more functions described herein.

Figure 15:
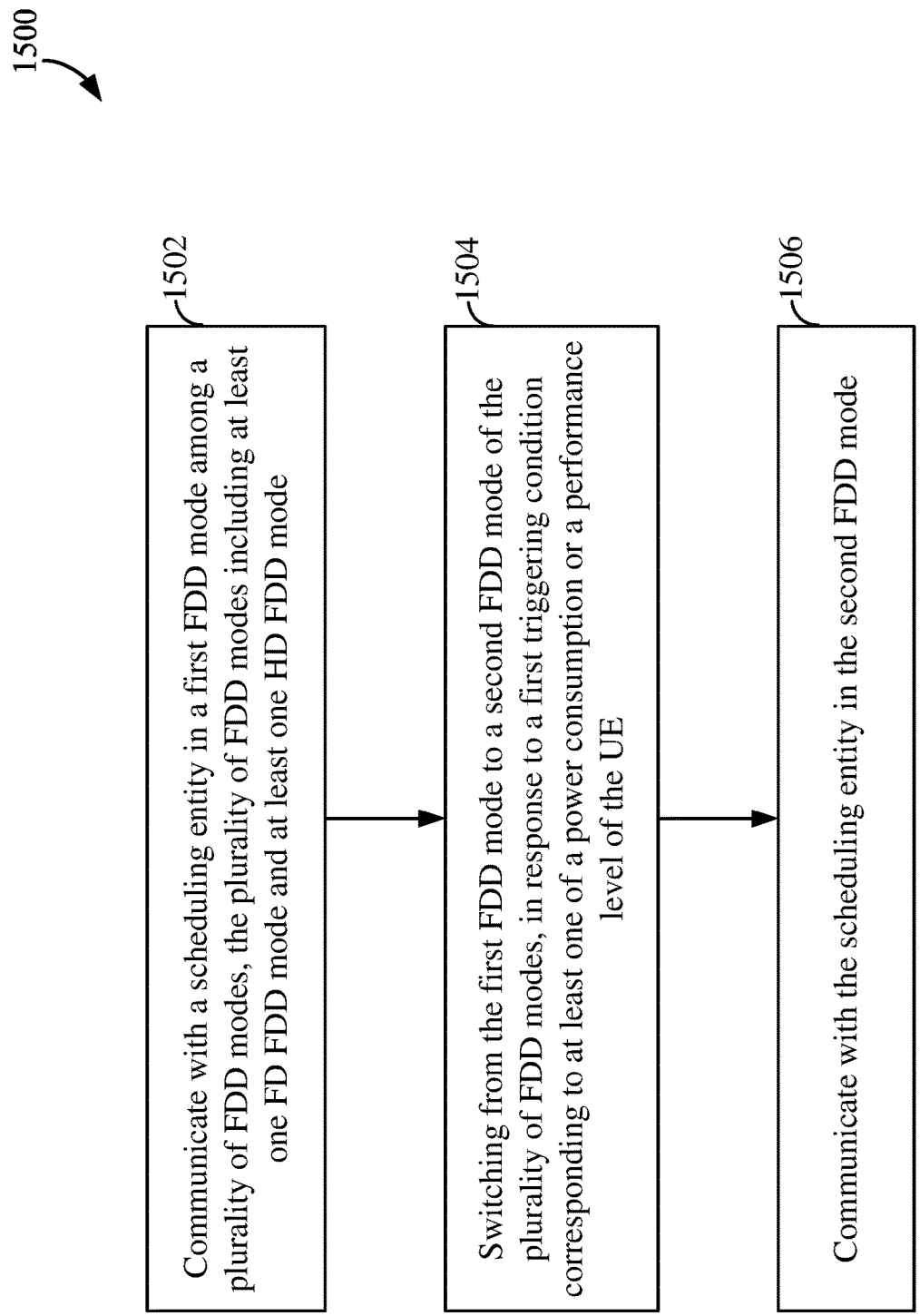
FIG. 15 is a flow chart illustrating an exemplary process for wireless communication using dynamic FDD modes switching at a scheduling entity according to some aspects of the disclosure.

FIG. 15 is a flow chart illustrating an exemplary process 1500 for wireless communication using dynamic FDD modes switching in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 1400 (e.g., UE) illustrated in FIG. 14. In some examples, the process 1500 may be carried out by any suitable apparatus or means for carrying out the functions or algorithm described below.

At block 1502, a UE can communicate with a scheduling entity (e.g., gNB or base station) in a first FDD mode among a plurality of FDD modes. The plurality of FDD modes includes at least one FD FDD mode and at least one HD FDD mode. In one example, the communication and processing circuitry 1440 can provide a means for communicating with the scheduling entity in the first FDD mode (e.g., a FD FDD mode or a HD FDD mode). In some aspects, the first FDD mode can use a first frequency band for an uplink transmission and a second frequency band for a downlink transmission, in a first configuration. In one aspect, the first FDD mode can be a HD FDD mode in which UL and DL transmissions are time-multiplexed and use different bands or sub-bands (e.g., bands F1 and F2 described in relation to FIG. 6). In one example, the first frequency band and the second frequency band may be paired FDD spectrum. In one example, the first frequency band and the second frequency band may be separated by a duplex distance to avoid interference. In one example, the first frequency band and second frequency band may be sub-bands of a TDD band. In one example, the first frequency band and second frequency band may correspond to different bandwidths or BWPs.

At block 1504, the UE can switch from the first FDD mode to a second FDD mode of the plurality of FDD modes, in response to a first triggering condition corresponding to at least one of a power consumption or a performance level of the UE. In some aspects, the UE can dynamically switch between FDD modes between different subframes or slots without using RRC signaling. In one aspect, the FDD mode switching circuit 1442 can provide a means for switching the UE from the first FDD mode (e.g., a first HD FDD mode) to the second FDD mode (e.g., a FD FDD mode or a second HD FDD mode). In some aspects, the triggering condition may relate to a communication latency between the UE and the scheduling entity, power efficiency of the UE, signal coverage, system loading information, traffic pattern, QoS requirements, etc. In one aspect, the UE may determine the triggering condition using a process 1600 described below in relation to FIG. 16.

In some aspects, the UE may determine the triggering condition in coordination with the scheduling entity. In one aspect, the UE may receive a MAC CE on a PDSCH that causes the UE to switch the FDD mode (e.g., from the HD FDD mode to the FD FDD mode). In one aspect, the UE may receive a DCI on a PDCCH that causes the UE to switch the FDD mode (e.g., from the first FDD mode to the second FDD mode). In one aspect, a scheduling entity may signal the UE to switch between the first FDD mode and the second FDD mode based on a predetermined time duration or timer (e.g., timer 1407). For example, the UE may receive timer information in system information (SI) and/or RRC signaling transmitted by the scheduling entity. The timer may cause the UE to switch between FDD modes (e.g., the first FDD mode and the second FDD mode) according to a predetermined pattern or periodicity.

At block 1506, the UE can communicate with the scheduling entity in the second FDD mode. In some aspects, the second FDD mode can use the first frequency band for the uplink transmission and the second frequency band for the downlink transmission, in a second configuration that is different from the first configuration. In one aspect, the communication and processing circuitry 1440 can provide a means for communicating with the scheduling entity using the second FDD mode. In one aspect, the second FDD mode may be a FD FDD mode in which the UE can perform UL and DL communication simultaneously using different frequency bands, for example, paired FDD spectrum or TDD sub-bands (e.g., see FIG. 5).

In some aspects, the UE may switch back to the first FDD mode (e.g., HD FDD mode) when a predetermined triggering condition is met. In one example, the UE can switch back to the HD FDD mode to reduce power consumption. In one example, the UE may switch to the HD FDD mode when the communication latency or coverage requirement is reduced.

Figure 16:
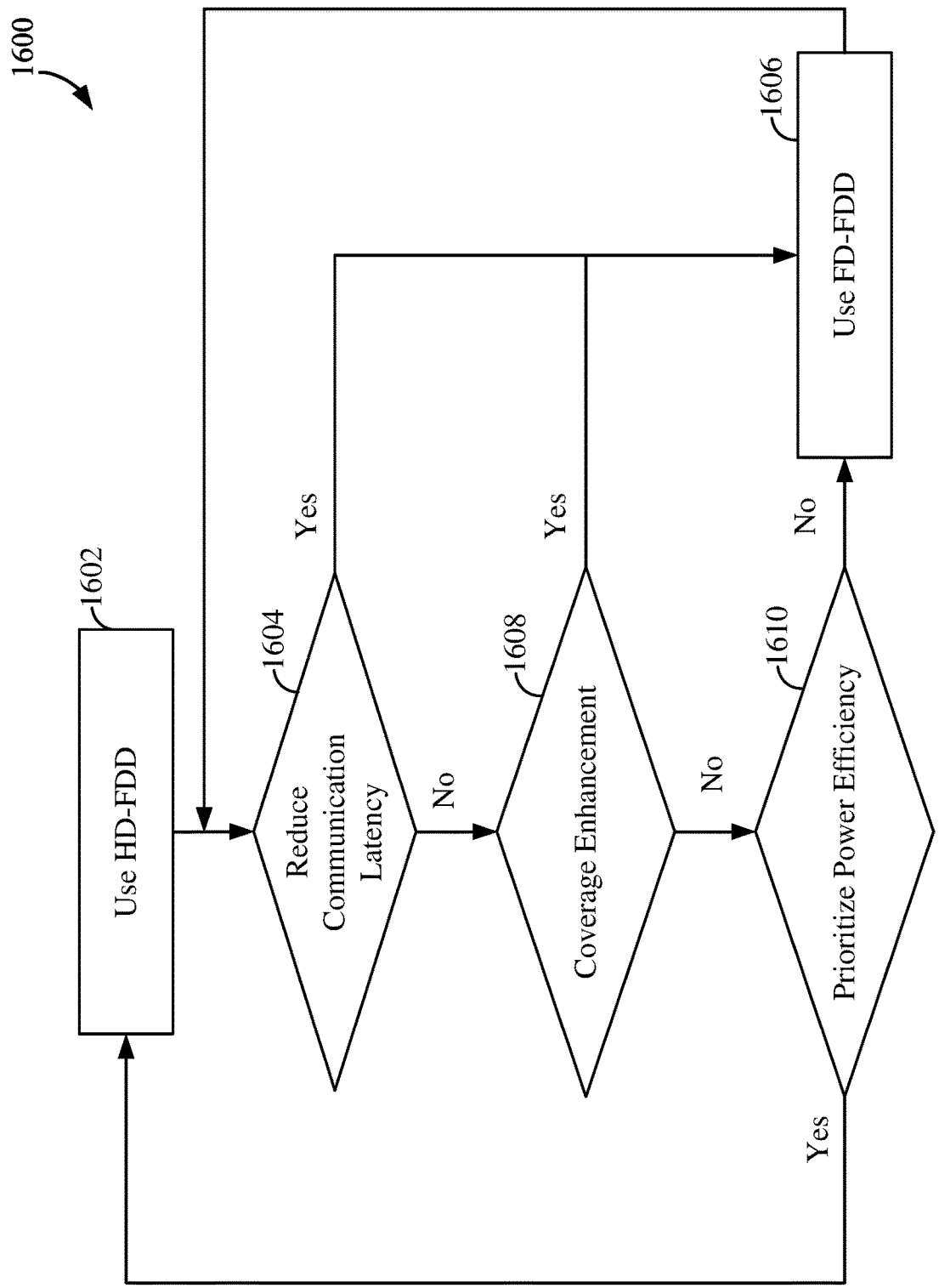
FIG. 16 is a flow chart illustrating an exemplary process for determining a triggering condition for dynamically switching between FDD modes according to some aspects of the disclosure.

FIG. 16 is a flow chart illustrating an exemplary process 1600 for determining a triggering condition for switching between different FDD modes according to some aspects of the disclosure. In some aspects, the process 1600 may be performed by any of the scheduling entities or UEs in FIGS. 1, 2, 7, 11, and/or 12. In some aspects, a UE may perform the process 1600 to determine a triggering condition in coordination with a scheduling entity.

At block 1602, a scheduling entity and a UE may communicate with each other using a first FDD mode (e.g., HD FDD mode). At decision block 1604, if the scheduling entity or the UE determines to reduce communication latency between the scheduling entity and the UE, the scheduling entity or the UE can initiate a FDD mode switch. For example, at block 1606, the scheduling entity and the UE can switch to use a second FDD mode that is different from the first FDD mode. For example, the second FDD mode may be a FD FDD mode that has a lower latency.

At decision block 1608, if the scheduling entity or the UE determines to enhance, improve, or increase communication signal coverage, the scheduling entity or the UE can initiate a FDD mode switch. For example, at block 1606, the scheduling entity and the UE can switch to use a second FDD mode (e.g., FD FDD mode) that has better signal coverage.

At decision block 1610, the scheduling entity or the UE can determine to use a FDD mode for prioritizing or improving the power efficiency of the UE. In one aspect, at block 1606, the scheduling entity and the UE can initiate a FDD mode switch to a FD FDD mode when power efficiency is not prioritized. In one aspect, the scheduling entity and the UE can continue to use the HD FDD mode if power efficiency is prioritized. In other aspects, the process of FIG. 16 may be modified in various different ways to add, remove, and/or rearrange the conditions used to determine the switching between FDD modes (e.g., FD FDD and HD FDD modes). In one example, two triggering conditions for FDD mode switching can be different in at least one of: communication latency; power efficiency; traffic pattern and QoS requirements; system loading information; or signal coverage. In some aspects, the scheduling entity and the UE can use the process 1600 to switch between different HD FDD modes (e.g., HD FDD mode 1 and HD FDD mode 2) that are different, for example, in power efficiency, latency, and/or signal coverage.

Figure 17:
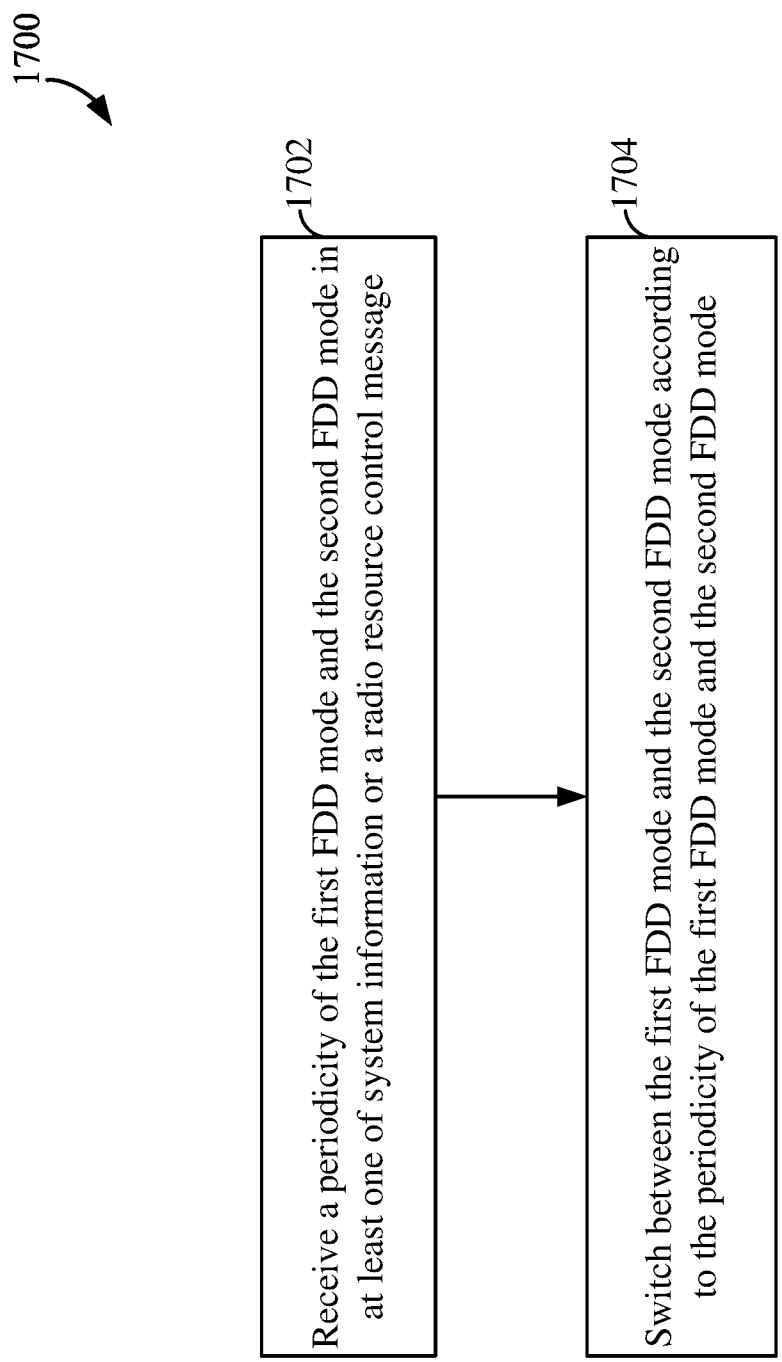
FIG. 17 is a flow chart illustrating an exemplary process for switching between different FDD modes according to a periodicity of the FDD modes.

FIG. 17 is a flow chart illustrating an exemplary process 1700 for switching between different FDD modes according to a periodicity of the FDD modes. In some aspects, the process 1700 may be performed by any of the scheduling entities or UEs in FIGS. 1, 2, 7, 11, and/or 12. At block 1702, a UE can receive a periodicity of a first FDD mode and a second FDD mode in at least one of system information or a radio resource control message. In some aspects, the periodicity may be a predetermined periodicity specified in a communication standard (e.g., 5G NR) that governs the communication between the scheduling entity and UE. In some aspects, a scheduling entity (e.g., gNB) can configure the periodicity of the FDD modes. At block 1704, the UE can switch between the first FDD mode and the second FDD mode according to the periodicity of the first FDD mode and the second FDD mode. In one aspect, the FDD mode switching circuit 1442 can provide a means for switching between the first FDD mode and the second FDD mode according to the periodicity of the first FDD mode and the second FDD mode. According to the periodicity, the UE and the scheduling entity can communicate using the first FDD mode in a first predetermined number of subframes/slots, and using the second FDD mode in a second predetermined number of subframes/slots.

Figure 18:
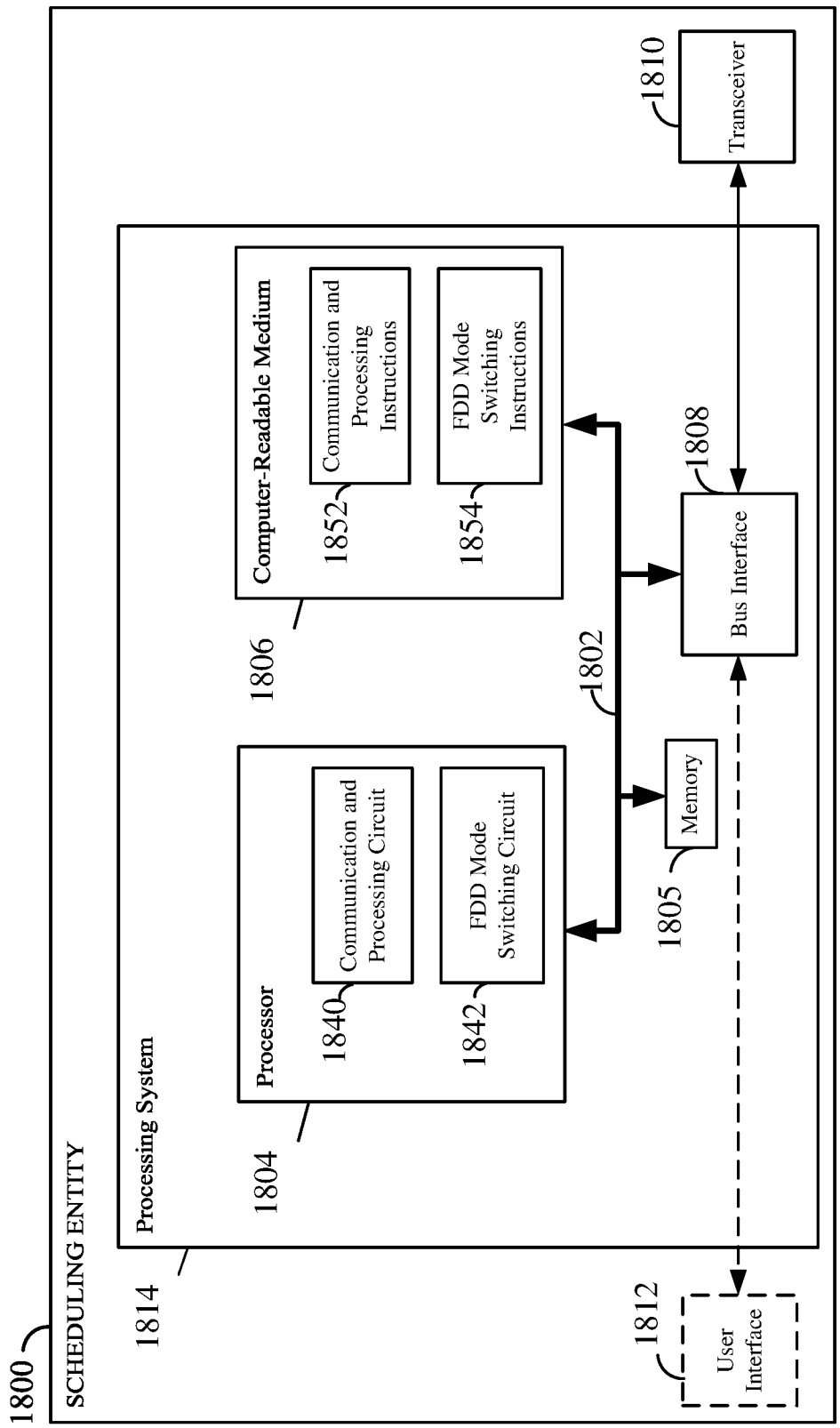
FIG. 18 is a block diagram illustrating an example of a hardware implementation for a scheduling entity according to some aspects of the disclosure.

FIG. 18 is a block diagram illustrating an example of a hardware implementation for a scheduling entity 1800 employing a processing system 1814. For example, the scheduling entity 1800 may be a scheduling entity (e.g., gNB) as illustrated in any one or more of FIGS. 1, 2, 7, 11, and/or 12.

The processing system 1814 may be substantially the same as the processing system 1414 illustrated in FIG. 14, including a bus interface 1808, a bus 1802, memory 1805, a processor 1804, and a computer-readable medium 1806. Furthermore, the scheduling entity 1800 may include an optional user interface 1812 and a transceiver 1810 substantially similar to those described above in FIG. 14. That is, the processor 1804, as utilized in a scheduling entity 1800, may be used to implement any one or more of the processes and procedures described and illustrated in FIGS. 7, 8, 11-13, 19, and 20. In some aspects of the disclosure, the processor 1804 may include circuitry configured for various functions, including, for example, wireless communication using various FDD modes (e.g., FD FDD and HD FDD modes) and FDD mode switching methods.

In some aspects of the disclosure, the processor 1804 may include communication and processing circuitry 1840 configured for various functions, including for example communicating with scheduled entities (e.g., UE). In some examples, the communication and processing circuitry 1840 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1840 may include one or more transmit/receive chains. In addition, the communication and processing circuitry 1840 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1840 may further be configured to execute communication and processing instructions (software) 1852 stored on the computer-readable medium 1806 to implement one or more functions described herein. For example, the communication and processing circuitry 1840 may be configured to use various FDD modes (e.g., FD FDD and HD FDD modes) for wireless communications.

In some implementations where the communication involves receiving information, the communication and processing circuitry 1840 may obtain information from a component of the wireless communication device 1800 (e.g., from the transceiver 1810 that receives the information via radio frequency signaling or some other type of signaling suitable for the applicable communication medium), process (e.g., decode) the information, and output the processed information. For example, the communication and processing circuitry 1840 may output the information to another component of the processor 1804, to the memory 1805, or to the bus interface 1808. In some examples, the communication and processing circuitry 1840 may receive one or more of signals, messages, other information, or any combination thereof. In some examples, the communication and processing circuitry 1840 may receive information via one or more channels. In some examples, the communication and processing circuitry 1840 may include functionality for a means for receiving. In some examples, the communication and processing circuitry 1840 may include functionality for a means for processing, including a means for demodulating, a means for decoding, etc.

In some implementations where the communication involves sending (e.g., transmitting) information, the communication and processing circuitry 1840 may obtain information (e.g., from another component of the processor 1804, the memory 1805, or the bus interface 1808), process (e.g., modulate, encode, etc.) the information, and output the processed information. For example, the communication and processing circuitry 1840 may output the information to the transceiver 1810 (e.g., that transmits the information via radio frequency signaling or some other type of signaling suitable for the applicable communication medium). In some examples, the communication and processing circuitry 1840 may send one or more of signals, messages, other information, or any combination thereof. In some examples, the communication and processing circuitry 1840 may send information via one or more channels. In some examples, the communication and processing circuitry 1840 may include functionality for a means for sending (e.g., a means for transmitting). In some examples, the communication and processing circuitry 1840 may include functionality for a means for generating, including a means for modulating, a means for encoding, etc.

In some aspects, the processor 1804 may include a FDD mode switching circuitry 1842 that can be configured to perform various functions and processes used to switch between different FDD modes, for example, a FD FDD mode and one or more HD FDD modes that can be used for wireless communication between the scheduling entity 1800 and a scheduled entity (e.g., UE). In some examples, the FDD mode switching circuitry 1842 may include one or more hardware components that provide the physical structure that performs processes related to dynamic FDD mode switching in wireless communication. In some examples, the scheduling entity can use the FDD mode switching circuitry 1842 to cause the UE to dynamically switch between different FDD modes in different subframes. The FDD mode switching circuitry 1842 may further be configured to execute FDD mode switching instructions (software) 1854 stored on the computer-readable medium 1406 to implement one or more functions described herein.

Figure 19:
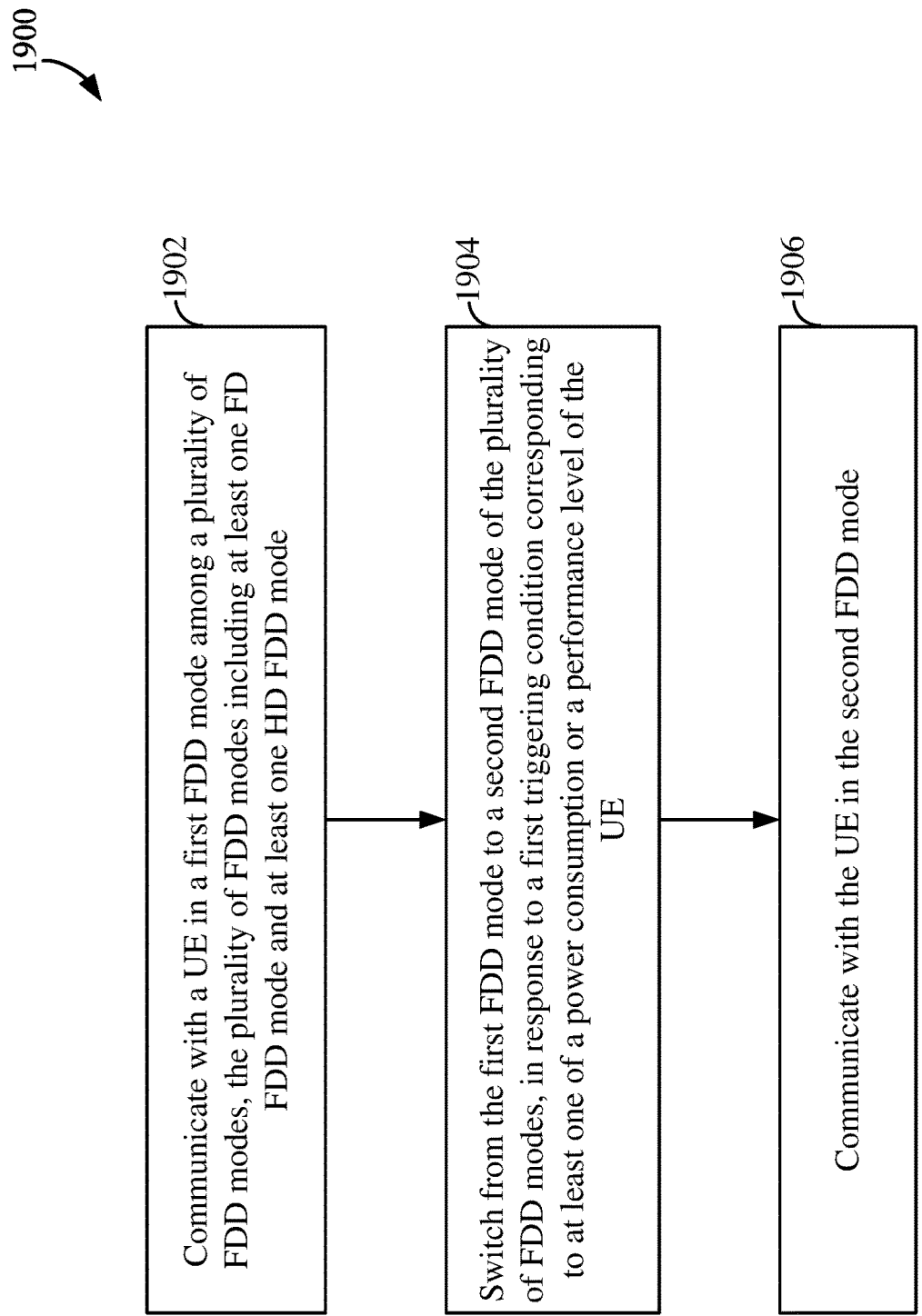
FIG. 19 is a flow chart illustrating an exemplary process for wireless communication using multiple FDD modes according to some aspects of the disclosure.

FIG. 19 is a flow chart illustrating an exemplary process 1900 for wireless communication using multiple FDD modes in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduling entity 1800 illustrated in FIG. 18. In some examples, the process 1900 may be carried out by any suitable apparatus or means for carrying out the functions or algorithm described below.

At block 1902, a scheduling entity (e.g., gNB) can communicate with a UE in a first FDD mode among a plurality of FDD modes. The plurality of FDD modes includes at least one FD FDD mode and at least one HD FDD mode. In one example, the communication and processing circuitry 1840 can provide a means for communicating with the UE in the first FDD mode (e.g., a FD FDD mode or a HD FDD mode). In some aspects, the first FDD mode can use a first frequency band for an uplink transmission and a second frequency band for a downlink transmission, in a first configuration. In one aspect, the first FDD mode can be a HD FDD mode in which UL and DL transmissions are time-multiplexed and use different bands or sub-bands (e.g., bands F1 and F2 described in relation to FIG. 6). In one example, the first frequency band and second frequency band may be paired FDD spectrum. In one example, the first frequency band and second frequency band may be sub-bands of a TDD band. In one example, the first frequency band and the second frequency band may correspond to different bandwidths or BWPs.

At block 1904, the scheduling entity can switch from the first FDD mode to a second FDD mode of the plurality of FDD modes, in response to a first triggering condition corresponding to at least one of a power consumption or a performance level of the UE. In one aspect, the FDD mode switching circuit 1842 can provide a means for switching from the first FDD mode (e.g., a first HD FDD mode) to the second FDD mode (e.g., a FD FDD mode or a second HD FDD mode). For example, scheduling entity can use the FDD mode switching circuitry 1842 to transmit a control message (e.g., DCI or MAC CE) to the UE to initiate FDD mode switching in response to the first triggering condition.

In some aspects, the triggering condition may relate to a communication latency between the UE and the scheduling entity, power efficiency of the UE, signal coverage, system loading information, traffic pattern, QoS requirements, etc. In one aspect, the scheduling entity may determine the triggering condition using the process 1600 described above in relation to FIG. 16. In some aspects, the scheduling entity may determine the triggering condition in coordination with the UE. In one aspect, the scheduling entity may transmit a MAC CE on a PDSCH that causes the UE to switch from the HD FDD mode to the FD FDD mode. In one aspect, the scheduling entity may transmit a DCI on a PDCCH that causes the UE to switch from the first FDD mode to the second FDD mode. In one aspect, a scheduling entity may signal the UE to switch between the first FDD mode and the second FDD mode based on a predetermined time duration or timer (e.g., timer 1407). For example, the scheduling entity may transmit timer information in system information (SI) and/or RRC signaling. The timer may cause the UE to switch between the first FDD mode and the second FDD mode according to a predetermined pattern or periodicity.

At block 1906, the scheduling entity can communicate with the UE in the second FDD mode. In one example, the communication and processing circuitry 1840 can provide a means for communicating with the UE in the second FDD mode. In some aspects, the second FDD mode can use the first frequency band for the uplink transmission and the second frequency band for the downlink transmission, in a second configuration that is different from the first configuration. In one aspect, the second FDD mode may be a FD FDD mode in which the scheduling entity can perform UL and DL communication simultaneously using different frequency bands, for example, paired FDD spectrum or TDD sub-bands.

In some aspects, the scheduling entity may switch back to the first FDD mode (e.g., HD FDD mode) when a predetermined triggering condition is met. In one example, the scheduling entity can switch back to the HD FDD mode to reduce power consumption of the UE. In one example, the scheduling entity may switch to the HD FDD mode when the communication latency or coverage requirement is reduced.

Figure 20:
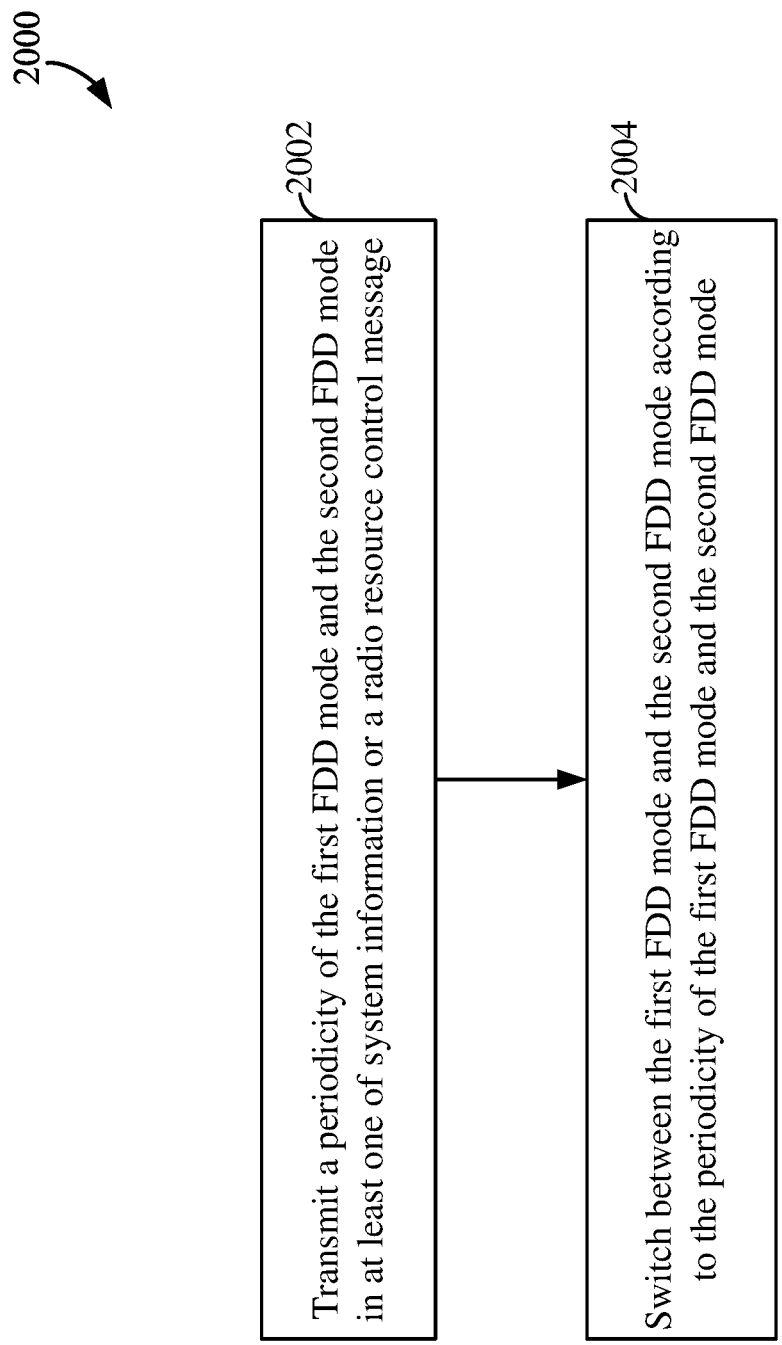
FIG. 20 is a flow chart illustrating an exemplary process for switching between different FDD modes according to a periodicity of the FDD modes.

FIG. 20 is a flow chart illustrating an exemplary process 2000 for switching between different FDD modes according to a periodicity of the FDD modes. In some aspects, the process 2000 may be performed by any of the scheduling entities or UEs in FIGS. 1, 2, 7, 11, and/or 12. At block 2002, a scheduling entity can transmit a periodicity of a first FDD mode and a second FDD mode in at least one of system information or a radio resource control message. In some aspects, the periodicity may be a predetermined periodicity specified in a communication standard (e.g., 5G NR) that governs the communication between the scheduling entity and a UE. At block 2004, the scheduling entity can switch or cause the UE to switch between the first FDD mode and the second FDD mode according to the periodicity of the first FDD mode and the second FDD mode. In one aspect, the FDD mode switching circuit 1842 can provide a means for switching between the first FDD mode and the second FDD mode according to the periodicity of the first FDD mode and the second FDD mode.

In a first aspect, a user equipment (UE) for wireless communication is provided. The UE includes a transceiver configured to use a plurality of frequency-division duplexing (FDD) modes for wireless communication, the plurality of FDD modes comprising at least one full-duplex (FD) FDD mode and at least one half-duplex (HD) FDD mode; a memory; and a processor connected with the transceiver and the memory. Wherein the processor and the memory are configured to: communicate, using the transceiver, with a scheduling entity in a first FDD mode among the plurality of FDD modes; switch from the first FDD mode to a second FDD mode of the plurality of FDD modes, in response to a first triggering condition corresponding to at least one of a power consumption or a performance level of the UE; and communicate with the scheduling entity in the second FDD mode.

In a second aspect, alone or in combination with the first aspect, wherein the processor and the memory are further configured to: receive, from the scheduling entity, at least one of a media access control (MAC) control element (CE) or downlink control information (DCI), configured to trigger the UE to switch from the first FDD mode to the second FDD mode.

In a third aspect, alone or in combination with any of the first to second aspects, wherein the processor and the memory are further configured to: switch between the first FDD mode and the second FDD mode according to a predetermined periodicity of the first FDD mode and the second FDD mode.

In a fourth aspect, alone or in combination with the third aspect, wherein the processor and the memory are further configured to: receive, from the scheduling entity, the predetermined periodicity of the first FDD mode and the second FDD mode in at least one of system information or a radio resource control message.

In a fifth aspect, alone or in combination with any of the first to fourth aspects, wherein the processor and the memory are further configured to: transmit, to the scheduling entity, at least one of a media access control (MAC) control element (CE) or uplink control information (UCI), that is configured to request the scheduling entity to switch from the first FDD mode to the second FDD mode.

In a sixth aspect, alone or in combination with any of the first to fifth aspects, wherein the plurality of FDD modes are different in terms of at least one of: an uplink-to-downlink time duration ratio; an uplink bandwidth and downlink bandwidth configuration; a time duration of a flexible slot of the HD FDD mode; a time duration of a flexible symbol of the HD FDD mode; a discontinuous reception (DRX) configuration; a discontinuous transmission (DTX) configuration; a downlink reference signal configuration; an uplink reference signal configuration; a radio link management configuration; or a radio resource management configuration.

In a seventh aspect, alone or in combination with any of the first to sixth aspects, wherein a frame of the HD FDD mode comprises at least one flexible slot that is configurable as a downlink slot, an uplink slot, a discontinuous reception (DRX) slot, or a discontinuous transmission (DTX) slot.

In an eighth aspect, alone or in combination with any of the first to seventh aspects, the processor and the memory are further configured to: switch from the second FDD mode to a third FDD mode of the plurality of FDD modes, in response to a second triggering condition that is different from the first triggering condition, wherein the first triggering condition and the second triggering condition are different in terms of at least one of: communication latency between the UE and the scheduling entity; power efficiency at the UE; traffic pattern and QoS requirements; system loading information; or signal coverage of the UE.

In a ninth aspect, a method of wireless communication at a user equipment (UE) is provided. The method includes: communicating with a scheduling entity in a first frequency-division duplexing (FDD) mode among a plurality of FDD modes, the plurality of FDD modes comprising at least one full-duplex (FD) FDD mode and at least one half-duplex (HD) FDD mode; switching from the first FDD mode to a second FDD mode of the plurality of FDD modes, in response to a first triggering condition corresponding to at least one of a power consumption of the UE or a performance level of the UE; and communicating with the scheduling entity in the second FDD mode.

In a tenth aspect, alone or in combination with the ninth aspect, the method further includes: receiving, from the scheduling entity, at least one of a media access control (MAC) control element (CE) or downlink control information (DCI), that is configured to trigger the UE to switch from the first FDD mode to the second FDD mode.

In an eleventh aspect, alone or in combination with any of the ninth to tenth aspects, the method further includes: switching between the first FDD mode and the second FDD mode according to a predetermined periodicity of the first FDD mode and the second FDD mode; and receiving, from the scheduling entity, the predetermined periodicity of the first FDD mode and the second FDD mode in at least one of system information or a radio resource control message.

In a twelfth aspect, alone or in combination with any of the ninth to eleventh aspects, the method further includes: transmitting, to the scheduling entity, at least one of a media access control (MAC) control element (CE) or uplink control information (UCI), that is configured to request the scheduling entity to switch from the first FDD mode to the second FDD mode.

In a thirteenth aspect, alone or in combination with any of the ninth to twelfth aspects, wherein the plurality of FDD modes are different in terms of at least one of: an uplink-to-downlink time duration ratio; an uplink bandwidth and downlink bandwidth configuration; a time duration of a flexible slot of the HD FDD mode; a time duration of a flexible symbol of the HD FDD mode; a discontinuous reception (DRX) configuration; a discontinuous transmission (DTX) configuration; a downlink reference signal configuration; an uplink reference signal configuration; a radio link management configuration; or a radio resource management configuration.

In a fourteenth aspect, alone or in combination with any of the ninth to thirteenth aspects, wherein a frame of the HD FDD mode comprises at least one flexible slot that is configurable as a downlink slot, an uplink slot, a discontinuous reception (DRX) slot, or a discontinuous transmission (DTX) slot.

In a fifteenth aspect, alone or in combination with any of the ninth to fourteenth aspects, the method further includes: switching from the second FDD mode to a third FDD mode of the plurality of FDD modes, in response to a second triggering condition that is different from the first triggering condition, wherein the first triggering condition and the second triggering condition are different in terms of at least one of: communication latency between the UE and the scheduling entity; power efficiency at the UE; traffic pattern and QoS requirements; system loading information; or signal coverage of the UE.

In a sixteenth aspect, a scheduling entity for wireless communication is provided. The scheduling entity includes: a transceiver configured to use a plurality of frequency-division duplexing (FDD) modes for wireless communication, the plurality of FDD modes comprising at least one full-duplex (FD) FDD mode and at least one half-duplex (HD) FDD mode; a memory; and a processor operatively coupled with the transceiver and the memory. Wherein the processor and the memory are configured to: communicate, using the transceiver, with a user equipment (UE) in a first FDD mode among the plurality of FDD modes; switch from the first FDD mode to a second FDD mode of the plurality of FDD modes, in response to a first triggering condition corresponding to at least one of a power consumption or a performance level of the UE; and communicate with the UE in the second FDD mode.

In a seventeenth aspect, alone or in combination with the sixteenth aspect, wherein the processor and the memory are further configured to: transmit, to the UE, at least one of a media access control (MAC) control element (CE) or downlink control information (DCI), configured to trigger the UE to switch from the first FDD mode to the second FDD mode.

In an eighteenth aspect, alone or in combination with any of the sixteenth to seventeenth aspects, wherein the processor and the memory are further configured to: configure the UE to switch between the first FDD mode and the second FDD mode according to a predetermined periodicity of the first FDD mode and the second FDD mode.

In a nineteenth aspect, alone or in combination with the eighteenth aspect, wherein the processor and the memory are further configured to: transmit the predetermined periodicity of the first FDD mode and the second FDD mode in at least one of system information or a radio resource control message.

In a twentieth aspect, alone or in combination with any of the sixteenth to nineteenth aspects, wherein the processor and the memory are further configured to: receive, from the UE, a media access control (MAC) control element (CE) or uplink control information (UCI), that is configured to request the scheduling entity to switch from the first FDD mode to the second FDD mode.

In a twenty-first aspect, alone or in combination with any of the sixteenth to twentieth aspects, wherein the plurality of FDD modes are different in terms of at least one of: an uplink-to-downlink time duration ratio; an uplink bandwidth and downlink bandwidth configuration; a time duration of a flexible slot of the HD FDD mode; a time duration for a flexible symbol of the HD FDD mode; a discontinuous reception (DRX) configuration; a discontinuous transmission (DTX) configuration; a downlink reference signal configuration; an uplink reference signal configuration; a radio link management configuration; or a radio resource management configuration.

In a twenty-second aspect, alone or in combination with any of the sixteenth to twenty-first aspects, wherein a frame of the HD FDD mode comprises at least one flexible slot that is configurable as a downlink slot, an uplink slot, a discontinuous reception (DRX) slot, or a discontinuous transmission (DTX) slot.

In a twenty-third aspect, alone or in combination with any of the sixteenth to twenty-second aspects, wherein the processor and the memory are further configured to: switch from the second FDD mode to a third FDD mode of the plurality of FDD modes, in response to a second triggering condition that is different from the first triggering condition. Wherein the first triggering condition and the second triggering condition are different in terms of at least one of: communication latency between the UE and the scheduling entity; power efficiency of the UE; traffic pattern and QoS requirements; system loading information of the scheduling entity; or signal coverage of the scheduling entity.

In a twenty-fourth aspect, a method of wireless communication at a scheduling entity is provided. The method includes: communicating with a user equipment (UE) in a first frequency-division duplexing (FDD) mode among a plurality of FDD modes, the plurality of FDD modes comprising at least one full-duplex (FD) FDD mode and at least one half-duplex (HD) FDD mode; switching from the first FDD mode to a second FDD mode of the plurality of FDD modes, in response to a first triggering condition corresponding to at least one of a power consumption or a performance level of the UE; and communicating with the UE in the second FDD mode.

In a twenty-fifth aspect, alone or in combination with the twenty-fourth aspect, the method further includes: transmitting, to the UE, at least one of a media access control (MAC) control element (CE) or downlink control information (DCI), configured to trigger the UE to switch from the first FDD mode to the second FDD mode.

In a twenty-sixth aspect, alone or in combination with any of the twenty-fourth to twenty-fifth aspects, the method further includes: configuring the UE to switch between the first FDD mode and the second FDD mode according to a predetermined periodicity of the first FDD mode and the second FDD mode; and transmitting the predetermined periodicity of the first FDD mode and the second FDD mode in at least one of system information or a radio resource control message.

In a twenty-seventh aspect, alone or in combination with any of the twenty-fourth to twenty-sixth aspects, the method further includes: receiving, from the UE, a media access control (MAC) control element (CE) or uplink control information (UCI), that is configured to request the scheduling entity to switch from the first FDD mode to the second FDD mode.

In a twenty-eighth aspect, alone or in combination with any of the twenty-fourth to twenty-seventh aspects, wherein the plurality of FDD modes are different in terms of at least one of: an uplink-to-downlink time duration ratio; an uplink bandwidth and downlink bandwidth configuration; a time duration of a flexible slot of the HD FDD mode; a time duration for a flexible symbol of the HD FDD mode; a discontinuous reception (DRX) configuration; a discontinuous transmission (DTX) configuration; a downlink reference signal configuration; an uplink reference signal configuration; a radio link management configuration; or a radio resource management configuration.

In a twenty-ninth aspect, alone or in combination with any of the twenty-fourth to twenty-eighth aspects, wherein a frame of the HD FDD mode comprises at least one flexible slot that is configurable as a downlink slot, an uplink slot, a discontinuous reception (DRX) slot, or a discontinuous transmission (DTX) slot.

In a thirtieth aspect, alone or in combination with any of the twenty-fourth to twenty-ninth aspects, the method further includes: switching from the second FDD mode to a third FDD mode of the plurality of FDD modes, in response to a second triggering condition that is different from the first triggering condition, wherein the first triggering condition and the second triggering condition are different in terms of at least one of: communication latency between the UE and the scheduling entity; power efficiency of the UE; traffic pattern and QoS requirements; system loading information of the scheduling entity; or signal coverage of the scheduling entity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
    a transceiver configured to use a plurality of frequency-division duplexing (FDD) modes for wireless communication, the plurality of FDD modes comprising at least one full-duplex (FD) FDD mode and at least one half-duplex (HD) FDD mode;
    a memory comprising instructions; and
    a processor configured to execute the instructions and cause the UE to:
        communicate, via the transceiver, in a first FDD mode among the plurality of FDD modes;
        receive, via the transceiver, at least one of a media access control (MAC) control element (CE) or downlink control information (DCI), each of the MAC CE and the DCI being configured to trigger the UE to switch from the first FDD mode to a second FDD mode of the plurality of FDD modes based on a first triggering condition;
        switch from the first FDD mode to the second FDD mode of the plurality of FDD modes, if the first triggering condition corresponds to a power consumption or a performance level of the UE;
        communicate, via the transceiver, in the second FDD mode that is different from the first FDD mode; and
        switch from the second FDD mode to a third FDD mode of the plurality of FDD modes, in response to a second triggering condition that is different from the first triggering condition, the third FDD mode being different from the first FDD mode and the second FDD mode.

2. The UE of claim 1, wherein the switch between the first FDD mode and the second FDD mode is based on a periodicity associated with the first FDD mode and the second FDD mode.

3. The UE of claim 2, wherein the processor is further configured to cause the UE to:
    receive, via the transceiver, the periodicity associated with the first FDD mode and the second FDD mode in at least one of system information or a radio resource control message.

4. The UE of claim 1, wherein the processor is further configured to cause the UE to:
    transmit, via the transceiver, at least one of a media access control (MAC) control element (CE) or uplink control information (UCI), that is configured to request a scheduling entity to switch from the first FDD mode to the second FDD mode.

5. The UE of claim 1, wherein the plurality of FDD modes are different in terms of at least one of:
    an uplink-to-downlink time duration ratio;
    an uplink bandwidth and downlink bandwidth configuration;
    a time duration of a flexible slot;
    a time duration of a flexible symbol;
    a discontinuous reception (DRX) configuration;
    a discontinuous transmission (DTX) configuration;
    a downlink reference signal configuration;
    an uplink reference signal configuration;
    a radio link management configuration; or
    a radio resource management configuration.

6. The UE of claim 1, where the processor is further configured to cause the UE to communicate in the at least one HD FDD mode,
    wherein the communication comprises a frame including at least one flexible slot that is configurable as a downlink slot, an uplink slot, a discontinuous reception (DRX) slot, or a discontinuous transmission (DTX) slot.

7. The UE of claim 1,
    wherein the first triggering condition and the second triggering condition are different in terms of at least one of:
    communication latency between the UE and a scheduling entity that has been in communication with the UE via the first FDD mode;
    power efficiency at the UE;
    traffic pattern and QoS requirements;
    system loading information; or
    signal coverage of the UE.

8. A method of wireless communication at a user equipment (UE), comprising:
- communicating in a first frequency-division duplexing (FDD) mode among a plurality of FDD modes, the plurality of FDD modes comprising at least one full-duplex (FD) FDD mode and at least one half-duplex (HD) FDD mode;
- receiving at least one of a media access control (MAC) control element (CE) or downlink control information (DCI), each of the MAC CE and the DCI being configured to trigger the UE to switch from the first FDD mode to a second FDD mode of the plurality of FDD modes based on a first triggering condition;
- switching from the first FDD mode to the second FDD mode of the plurality of FDD modes, if the first triggering condition corresponds to a power consumption of the UE or a performance level of the UE;
- communicating in the second FDD mode that is different from the first FDD mode; and
- switching from the second FDD mode to a third FDD mode of the plurality of FDD modes, in response to a second triggering condition that is different from the first triggering condition, the third FDD mode being different from the first FDD mode and the second FDD mode.

9. The method of claim 8, wherein the
- switching between the first FDD mode and the second FDD mode is based on a periodicity associated with the first FDD mode and the second FDD mode; and further comprising:
- receiving the periodicity associated with the first FDD mode and the second FDD mode in at least one of system information or a radio resource control message.

10. The method of claim 8, further comprising:
- transmitting at least one of a media access control (MAC) control element (CE) or uplink control information (UCI), that is configured to request a scheduling entity to switch from the first FDD mode to the second FDD mode.

11. The method of claim 8, wherein the plurality of FDD modes are different in terms of at least one of:
- an uplink-to-downlink time duration ratio;
- an uplink bandwidth and downlink bandwidth configuration;
- a time duration of a flexible slot;
- a time duration of a flexible symbol;
- a discontinuous reception (DRX) configuration;
- a discontinuous transmission (DTX) configuration;
- a downlink reference signal configuration;
- an uplink reference signal configuration;
- a radio link management configuration; or
- a radio resource management configuration.

12. The method of claim 8, further comprising:
- communicating in the at least one HD FDD mode,
- wherein the communication comprises a frame including at least one flexible slot that is configurable as a downlink slot, an uplink slot, a discontinuous reception (DRX) slot, or a discontinuous transmission (DTX) slot.

13. The method of claim 8,
- wherein the first triggering condition and the second triggering condition are different in terms of at least one of:
- communication latency between the UE and a scheduling entity that has been in communication with the UE via the first FDD mode;
- power efficiency at the UE;
- traffic pattern and QoS requirements;
- system loading information; or
- signal coverage of the UE.

14. A scheduling entity for wireless communication, comprising:
- a transceiver configured to use a plurality of frequency-division duplexing (FDD) modes for wireless communication, the plurality of FDD modes comprising at least one full-duplex (FD) FDD mode and at least one half-duplex (HD) FDD mode;
- a memory comprising instructions; and
- a processor configured to execute the instructions and cause the scheduling entity to:
  - communicate, via the transceiver, in a first FDD mode among the plurality of FDD modes;
  - transmit, via the transceiver, at least one of a media access control (MAC) control element (CE) or downlink control information (DCI), each of the MAC CE and the DCI being configured to trigger a user equipment (UE) to switch from the first FDD mode to a second FDD mode of the plurality of FDD modes based on a first triggering condition;
  - switch from the first FDD mode to the second FDD mode of the plurality of FDD modes, if the first triggering condition corresponds to a power consumption or a performance level of the UE;
  - communicate, via the transceiver, in the second FDD mode that is different from the first FDD mode; and
  - switch from the second FDD mode to a third FDD mode of the plurality of FDD modes, in response to a second triggering condition that is different from the first triggering condition, the third FDD mode being different from the first FDD mode and the second FDD mode.

15. The scheduling entity of claim 14, wherein the switch between the first FDD mode and the second FDD mode is based on a periodicity associated with the first FDD mode and the second FDD mode.

16. The scheduling entity of claim 15, wherein the processor is further configured to cause the scheduling entity to:
- transmit, via the transceiver, the periodicity associated with the first FDD mode and the second FDD mode in at least one of system information or a radio resource control message.

17. The scheduling entity of claim 14, wherein the processor is further configured to cause the scheduling entity to:
- receive, via the transceiver, a media access control (MAC) control element (CE) or uplink control information (UCI), that is configured to request the scheduling entity to switch from the first FDD mode to the second FDD mode.

18. The scheduling entity of claim 14, wherein the plurality of FDD modes are different in terms of at least one of:
- an uplink-to-downlink time duration ratio;
- an uplink bandwidth and downlink bandwidth configuration;
- a time duration of a flexible slot;
- a time duration for a flexible symbol;
- a discontinuous reception (DRX) configuration;
- a discontinuous transmission (DTX) configuration;
- a downlink reference signal configuration;
- an uplink reference signal configuration;
- a radio link management configuration; or
- a radio resource management configuration.

19. The scheduling entity of claim 14, where the processor is further configured to cause the scheduling entity to communicate in the at least one HD FDD mode,
- wherein the communication comprises a frame including at least one flexible slot that is configurable as a downlink slot, an uplink slot, a discontinuous reception (DRX) slot, or a discontinuous transmission (DTX) slot.

20. The scheduling entity of claim 14,
wherein the first triggering condition and the second triggering condition are different in terms of at least one of:
communication latency between the UE and the scheduling entity;
power efficiency of the UE;
traffic pattern and QoS requirements;
system loading information of the scheduling entity; or
signal coverage of the scheduling entity.

21. A method of wireless communication at a scheduling entity, comprising:
communicating in a first frequency-division duplexing (FDD) mode among a plurality of FDD modes, the plurality of FDD modes comprising at least one full-duplex (FD) FDD mode and at least one half-duplex (HD) FDD mode;
transmitting at least one of a media access control (MAC) control element (CE) or downlink control information (DCI), each of the MAC CE and the DCI being configured to trigger a user equipment (UE) to switch from the first FDD mode to a second FDD mode of the plurality of FDD modes based on a first triggering condition;
switching from the first FDD mode to the second FDD mode of the plurality of FDD modes, if the first triggering condition corresponds to a power consumption or a performance level of the UE;
communicating with the UE in the second FDD mode that is different from the first FDD; and
switching from the second FDD mode to a third FDD mode of the plurality of FDD modes, in response to a second triggering condition that is different from the first triggering condition, the third FDD mode being different from the first FDD mode and the second FDD mode.

22. The method of claim 21, wherein the switching between the first FDD mode and the second FDD mode is based on a periodicity associated with the first FDD mode and the second FDD mode; and further comprising:
transmitting the periodicity associated with the first FDD mode and the second FDD mode in at least one of system information or a radio resource control message.

23. The method of claim 21, further comprising:
receiving a media access control (MAC) control element (CE) or uplink control information (UCI), that is configured to request the scheduling entity to switch from the first FDD mode to the second FDD mode.

24. The method of claim 21, wherein the plurality of FDD modes are different in terms of at least one of:
an uplink-to-downlink time duration ratio;
an uplink bandwidth and downlink bandwidth configuration;
a time duration of a flexible slot;
a time duration for a flexible symbol;
a discontinuous reception (DRX) configuration;
a discontinuous transmission (DTX) configuration;
a downlink reference signal configuration;
an uplink reference signal configuration;
a radio link management configuration; or
a radio resource management configuration.

25. The method of claim 21, further comprising:
communicating in the at least one HD FDD mode,
wherein the communication comprises a frame including at least one flexible slot that is configurable as a downlink slot, an uplink slot, a discontinuous reception (DRX) slot, or a discontinuous transmission (DTX) slot.

26. The method of claim 21,
wherein the first triggering condition and the second triggering condition are different in terms of at least one of:
communication latency between the UE and the scheduling entity;
power efficiency of the UE;
traffic pattern and QoS requirements;
system loading information of the scheduling entity; or
signal coverage of the scheduling entity.

* * * * *